US008275709B2

(12) United States Patent
Wang et al.

(10) Patent No.: US 8,275,709 B2
(45) Date of Patent: Sep. 25, 2012

(54) DIGITAL RIGHTS MANAGEMENT OF CONTENT WHEN CONTENT IS A FUTURE LIVE EVENT

(75) Inventors: Xin Wang, Torrance, CA (US); Tushar N. Padhye, Hosur (IN); M. S. Roopa, Bangalore (IN); C. V. Joshi, Bangalore (IN); Basavaraj B. H., Bangalore (IN); Arun Ray, Bangalore (IN); Deepanjan Kanungo, Bangalore (IN); Aram Nahidipour, Lagvna Niguel, CA (US); Thanh Ta, Huntington Beach, CA (US); Michael Raley, Downey, CA (US); Guillermo Lao, Torrance, CA (US); Eddie Chen, Rancho Palos Verdes, CA (US); Bijan Tadayon, Germantown, MD (US); Anant Kansal, Bangalore (IN)

(73) Assignee: ContentGuard Holdings, Inc., Wilmington, DE (US)

( * ) Notice: Subject to any disclaimer, the term of this patent is extended or adjusted under 35 U.S.C. 154(b) by 517 days.

(21) Appl. No.: 12/144,732

(22) Filed: Jun. 24, 2008

(65) Prior Publication Data

US 2009/0265278 A1 Oct. 22, 2009

Related U.S. Application Data

(63) Continuation-in-part of application No. 10/162,699, filed on Jun. 6, 2002, now Pat. No. 8,099,364.

(51) Int. Cl.
*H04L 9/00* (2006.01)
*G06F 15/173* (2006.01)

(52) U.S. Cl. .............................. 705/40; 726/27; 709/224

(58) Field of Classification Search .................... 705/40; 726/27
See application file for complete search history.

(56) References Cited

U.S. PATENT DOCUMENTS

| 3,263,158 A | 7/1966 | Bargen et al. |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |

(Continued)

FOREIGN PATENT DOCUMENTS

BR 9810967 A 10/2001

(Continued)

OTHER PUBLICATIONS

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

(Continued)

*Primary Examiner* — Evens J Augustin
(74) *Attorney, Agent, or Firm* — Stephen M. Hertzler; Marc S. Kaufman; Reed Smith LLP

(57) ABSTRACT

A system for managing use of digital content within a trusted community. An access list defines the trusted community. License requests for use of content made from outside the trusted community are handled in accordance with a license request policy process.

18 Claims, 16 Drawing Sheets

U.S. PATENT DOCUMENTS

| | | | |
|---|---|---|---|
| 4,361,851 A | 11/1982 | Asip et al. | |
| 4,423,287 A | 12/1983 | Zeidler | |
| 4,429,385 A | 1/1984 | Cichelli et al. | |
| 4,442,486 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,621,321 A | 11/1986 | Boebert et al. | |
| 4,644,493 A | 2/1987 | Chandra et al. | |
| 4,658,093 A | 4/1987 | Hellman | |
| 4,713,753 A | 12/1987 | Boebert et al. | |
| 4,736,422 A | 4/1988 | Mason | |
| 4,740,890 A | 4/1988 | William | |
| 4,796,220 A | 1/1989 | Wolfe | |
| 4,816,655 A | 3/1989 | Musyck et al. | |
| 4,817,140 A | 3/1989 | Chandra et al. | |
| 4,827,508 A | 5/1989 | Shear | |
| 4,868,376 A | 9/1989 | Lessin et al. | |
| 4,888,638 A | 12/1989 | Bohn | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,129,083 A | 7/1992 | Cutler et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,174,641 A | 12/1992 | Lim | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,276,901 A * | 1/1994 | Howell et al. | 340/5.2 |
| 5,287,408 A | 2/1994 | Samson | |
| 5,291,596 A | 3/1994 | Mita | |
| 5,293,422 A | 3/1994 | Loiacono | |
| 5,301,231 A | 4/1994 | Abraham et al. | |
| 5,311,591 A | 5/1994 | Fischer | |
| 5,319,705 A | 6/1994 | Halter et al. | |
| 5,335,275 A | 8/1994 | Millar et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,386,369 A | 1/1995 | Christiano | |
| 5,390,297 A | 2/1995 | Barber et al. | |
| 5,394,469 A | 2/1995 | Nagel et al. | |
| 5,410,598 A | 4/1995 | Shear | |
| 5,412,717 A | 5/1995 | Fischer | |
| 5,414,852 A | 5/1995 | Kramer et al. | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,485,577 A | 1/1996 | Eyer et al. | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,816 A | 4/1996 | Hamilton et al. | |
| 5,504,818 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,535,276 A | 7/1996 | Ganesan | |
| 5,539,735 A | 7/1996 | Moskowitz | |
| 5,553,143 A | 9/1996 | Ross et al. | |
| 5,557,678 A | 9/1996 | Ganesan | |
| 5,563,946 A | 10/1996 | Cooper et al. | |
| 5,564,038 A | 10/1996 | Grantz et al. | |
| 5,568,552 A | 10/1996 | Davis | |
| 5,619,570 A | 4/1997 | Tsutsui | |
| 5,621,797 A | 4/1997 | Rosen | |
| 5,625,690 A | 4/1997 | Michel et al. | |
| 5,629,980 A | 5/1997 | Stefik et al. | |
| 5,633,932 A | 5/1997 | Davis et al. | |
| 5,634,012 A | 5/1997 | Stefik et al. | |
| 5,636,346 A | 6/1997 | Saxe | |
| 5,638,443 A | 6/1997 | Stefik et al. | |
| 5,638,513 A | 6/1997 | Ananda | |
| 5,649,013 A | 7/1997 | Stuckey et al. | |
| 5,655,077 A | 8/1997 | Jones et al. | |
| 5,671,412 A | 9/1997 | Christiano | |
| 5,708,709 A | 1/1998 | Rose | |
| 5,708,717 A | 1/1998 | Alasia | |
| 5,715,403 A | 2/1998 | Stefik | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,745,879 A | 4/1998 | Wyman | |
| 5,748,783 A | 5/1998 | Rhoads | |
| 5,757,907 A | 5/1998 | Cooper et al. | |
| 5,760,917 A * | 6/1998 | Sheridan | 358/442 |
| 5,761,686 A | 6/1998 | Bloomberg | |
| 5,764,807 A | 6/1998 | Pearlman et al. | |
| 5,765,152 A | 6/1998 | Erickson | |
| 5,768,426 A | 6/1998 | Rhoads | |
| 5,787,172 A | 7/1998 | Arnold | |
| 5,790,664 A | 8/1998 | Coley et al. | |
| 5,790,677 A | 8/1998 | Fox et al. | |
| 5,812,664 A | 9/1998 | Bernobich et al. | |
| 5,825,876 A | 10/1998 | Peterson | |
| 5,825,879 A | 10/1998 | Davis | |
| 5,825,892 A | 10/1998 | Braudaway et al. | |
| 5,838,792 A | 11/1998 | Ganesan | |
| 5,848,154 A | 12/1998 | Nishio et al. | |
| 5,848,378 A | 12/1998 | Shelton et al. | |
| 5,848,413 A | 12/1998 | Wolff | |
| 5,850,433 A | 12/1998 | Rondeau | |
| 5,870,473 A * | 2/1999 | Boesch et al. | 705/78 |
| 5,884,280 A | 3/1999 | Hasegawa et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,925,127 A | 7/1999 | Ahmad | |
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |

| Patent Number | Kind | Date | Inventor | Class |
|---|---|---|---|---|
| 5,983,207 | A * | 11/1999 | Turk et al. | 705/39 |
| 5,987,134 | A | 11/1999 | Shin et al. | |
| 5,999,624 | A | 12/1999 | Hopkins | |
| 5,999,949 | A | 12/1999 | Crandall | |
| 6,006,332 | A | 12/1999 | Rabne et al. | |
| 6,009,401 | A | 12/1999 | Horstmann | |
| 6,009,525 | A | 12/1999 | Horstmann | |
| 6,012,898 | A | 1/2000 | Nakamura et al. | |
| 6,020,882 | A | 2/2000 | Kinghorn et al. | |
| 6,047,067 | A | 4/2000 | Rosen | |
| 6,056,786 | A | 5/2000 | Rivera et al. | |
| 6,073,124 | A | 6/2000 | Krishnan et al. | |
| 6,073,234 | A | 6/2000 | Kigo et al. | |
| 6,091,777 | A | 7/2000 | Guetz et al. | |
| 6,112,181 | A | 8/2000 | Shear et al. | |
| 6,112,239 | A | 8/2000 | Kenner et al. | |
| 6,115,471 | A | 9/2000 | Oki et al. | |
| 6,135,646 | A | 10/2000 | Kahn et al. | |
| 6,138,119 | A | 10/2000 | Hall et al. | |
| 6,141,754 | A | 10/2000 | Choy | |
| 6,157,719 | A | 12/2000 | Wasilewski et al. | |
| 6,157,721 | A | 12/2000 | Shear et al. | |
| 6,169,976 | B1 | 1/2001 | Colosso | |
| 6,185,683 | B1 | 2/2001 | Ginter et al. | |
| 6,189,037 | B1 | 2/2001 | Adams et al. | |
| 6,189,146 | B1 | 2/2001 | Misra et al. | |
| 6,195,654 | B1 * | 2/2001 | Wachtel | 1/1 |
| 6,209,092 | B1 | 3/2001 | Linnartz | |
| 6,216,112 | B1 | 4/2001 | Fuller et al. | |
| 6,219,652 | B1 | 4/2001 | Carter et al. | |
| 6,226,618 | B1 | 5/2001 | Downs et al. | |
| 6,233,684 | B1 | 5/2001 | Stefik et al. | |
| 6,236,971 | B1 | 5/2001 | Stefik et al. | |
| 6,237,786 | B1 | 5/2001 | Ginter et al. | |
| 6,240,185 | B1 | 5/2001 | Van Wie et al. | |
| 6,253,193 | B1 | 6/2001 | Ginter et al. | |
| 6,263,313 | B1 | 7/2001 | Milsted et al. | |
| 6,266,618 | B1 | 7/2001 | Ye et al. | |
| 6,292,569 | B1 | 9/2001 | Shear et al. | |
| 6,301,660 | B1 | 10/2001 | Benson | |
| 6,307,939 | B1 | 10/2001 | Vigarie | |
| 6,327,652 | B1 | 12/2001 | England et al. | |
| 6,330,670 | B1 | 12/2001 | England et al. | |
| 6,345,256 | B1 | 2/2002 | Milsted et al. | |
| 6,353,888 | B1 | 3/2002 | Kakehi et al. | |
| 6,363,488 | B1 | 3/2002 | Ginter et al. | |
| 6,385,596 | B1 | 5/2002 | Wiser et al. | |
| 6,389,402 | B1 | 5/2002 | Ginter et al. | |
| 6,397,333 | B1 | 5/2002 | Söhne et al. | |
| 6,401,211 | B1 | 6/2002 | Brezak, Jr. et al. | |
| 6,405,369 | B1 | 6/2002 | Tsuria | |
| 6,424,717 | B1 | 7/2002 | Pinder et al. | |
| 6,424,947 | B1 | 7/2002 | Tsuria et al. | |
| 6,466,920 | B1 | 10/2002 | Okayama et al. | |
| 6,480,885 | B1 * | 11/2002 | Olivier | 709/207 |
| 6,487,659 | B1 | 11/2002 | Kigo et al. | |
| 6,516,052 | B2 | 2/2003 | Voudouris | |
| 6,516,413 | B1 | 2/2003 | Aratani et al. | |
| 6,523,745 | B1 | 2/2003 | Tamori | |
| 6,578,008 | B1 | 6/2003 | Chacker | |
| 6,578,072 | B2 * | 6/2003 | Watanabe et al. | 709/217 |
| 6,587,837 | B1 | 7/2003 | Spagna et al. | |
| 6,796,555 | B1 | 9/2004 | Blahut | |
| 6,853,728 | B1 | 2/2005 | Kahn et al. | |
| 6,938,021 | B2 | 8/2005 | Shear et al. | |
| 7,043,488 | B1 | 5/2006 | Baer et al. | |
| 7,080,139 | B1 * | 7/2006 | Briggs et al. | 709/224 |
| 7,213,261 | B1 * | 5/2007 | Gomez et al. | 726/7 |
| 7,240,359 | B1 | 7/2007 | Sie et al. | |
| 7,467,212 | B2 * | 12/2008 | Adams et al. | 709/229 |
| 7,484,246 | B2 * | 1/2009 | Matsuyama et al. | 726/27 |
| 2001/0009026 | A1 | 7/2001 | Terao et al. | |
| 2001/0011276 | A1 | 8/2001 | Durst, Jr. et al. | |
| 2001/0014206 | A1 | 8/2001 | Artigalas et al. | |
| 2001/0036224 | A1 * | 11/2001 | Demello et al. | 375/220 |
| 2001/0037467 | A1 | 11/2001 | O'Toole, Jr. et al. | |
| 2001/0039659 | A1 | 11/2001 | Simmons et al. | |
| 2001/0049824 | A1 | 12/2001 | Baker et al. | |
| 2002/0001387 | A1 | 1/2002 | Dillon | |
| 2002/0004779 | A1 * | 1/2002 | Turk et al. | 705/39 |
| 2002/0035618 | A1 | 3/2002 | Mendez et al. | |
| 2002/0044658 | A1 | 4/2002 | Wasilewski et al. | |
| 2002/0049686 | A1 * | 4/2002 | Chuang et al. | 706/45 |
| 2002/0049717 | A1 | 4/2002 | Routtenberg et al. | |
| 2002/0051407 | A1 | 5/2002 | Griner et al. | |
| 2002/0052925 | A1 * | 5/2002 | Kim et al. | 709/217 |
| 2002/0056118 | A1 | 5/2002 | Hunter et al. | |
| 2002/0069282 | A1 | 6/2002 | Reisman | |
| 2002/0083006 | A1 | 6/2002 | Headings et al. | |
| 2002/0087496 | A1 * | 7/2002 | Stirpe et al. | 706/45 |
| 2002/0099948 | A1 | 7/2002 | Kocher et al. | |
| 2002/0127423 | A1 | 9/2002 | Kayanakis | |
| 2002/0154157 | A1 | 10/2002 | Sherr et al. | |
| 2002/0161473 | A1 | 10/2002 | Higuchi et al. | |
| 2002/0184158 | A1 | 12/2002 | Tadayon et al. | |
| 2003/0023564 | A1 | 1/2003 | Padhye et al. | |
| 2003/0054810 | A1 * | 3/2003 | Chen et al. | 455/422 |
| 2003/0097567 | A1 | 5/2003 | Terao et al. | |
| 2003/0225836 | A1 * | 12/2003 | Lee et al. | 709/205 |
| 2004/0015437 | A1 * | 1/2004 | Choi et al. | 705/40 |
| 2004/0024688 | A1 | 2/2004 | Bi et al. | |
| 2004/0052370 | A1 | 3/2004 | Katznelson | |
| 2004/0088355 | A1 * | 5/2004 | Hagan et al. | 709/203 |
| 2004/0172552 | A1 | 9/2004 | Boyles et al. | |
| 2007/0244812 | A1 * | 10/2007 | Turk et al. | 705/39 |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 4180451 | 6/1992 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |

| | | |
|---|---|---|
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 20000-322352 | 11/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/09703 A1 | 2/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" DRAFT (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL: http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kain, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pp. numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pp. numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pp., pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
Ius Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary.thefreedictionary.com, www.nist.gov, cn.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).
Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).
International Search Report issued in corresponding Application No. PCT/US05/00337 mailed Aug. 24, 2007.
"ContentGuard Launches eBook Practice for Online Bookstores and Publishers", Business Wire. Aug. 29, 2000 [recovered from Dialog database on Sep. 10, 2007].
European Search Report dated May 25, 2004 (European Patent Application No. 01 97 9833).
Business Editors, "Upstart tTechnology Firm iUniverse.com Unveils Plans to Revutionize Publishing World", Business Wire. New York: Oct. 18, 1999 [receovered from proquest Oniline Database Jun. 21, 2006].
Beck, Rachel. "Barnes and Noble Bus intoiUnierse". Seattle Post-intelligencer. Washington: Nov. 3, 1999. [receovered form Proquest Online Database Jun. 21, 2006].
www.iUniveres .com [online] Jan. 16, 2000 [retrieved Jun. 21, 2006], Recovered from the internet Archive Wayback machine at www. archive.org. <URL: http://www.iuniverse.com>.
Caney, Derek. "Barnes and Noble buys stake web publisher iUniverse". Pittsburgh Post-Gazette. Pennsylvania: Nov. 3, 1999. [receovered from proquest Online Database Jun. 21, 2006].
Beizer, Doug. "Web site sells books printed to order, and it's a boon for readers and authors instant books". Virginian-Pilot. Virginia: Sep. 4, 2000. [receovered from Proquest Online Database Jun. 21, 2006]. Conhaim, Wallys W. "The e-publishing revolution". Link-Up. Medford: Mar./Apr. 2000. vol. 17, Iss. 2. [receovered form Proquest Online Database Jun. 21, 2006].
International Search Report dated Dec. 17, 2001; Form PCT/ISA/220, Form PCT/ISA/210, (total 5 pages).
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of the IEICE, Vo. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.
Strattner, A, "Cash Register on a Chip may Revolutionaize Software Pricing and Distribution; Wave Systems Corp.", pp. 1-3, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmell, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue I.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", pp. 1-24, 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multimedia Environment", Apr. 2-3, 1993, Knowbots, Permissions Headers & Contract Law.
Delaigle, "Digital Watermarking," Spie Conference in Optical Security and Counterfeit Deterrence Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3, 1993).

* cited by examiner

DIGITAL RIGHTS MANAGEMENT OF CONTENT WHEN CONTENT IS A FUTURE LIVE EVENT

RELATED APPLICATION DATA

This application is a Continuation-In-Part application to U.S. utility application Ser. No. 10/162,699 filed Jun. 6, 2002 entitled Digital Rights Management Of Content When Content Is A Future Live Event, which claims benefit from U.S. provisional application No. 60/296,116 filed on Jun. 7, 2001, the entire disclosures of which are incorporated herein by reference.

BACKGROUND OF THE INVENTION

1. Field of the Invention

The present invention is directed generally to managing use of digital content. In particular, this invention relates to managing usage rights for trusted communities.

2. Description of Related Art

One of the most important issues impeding the widespread distribution of digital works via electronic means, and the Internet in particular, is the current lack of protection of intellectual property rights of content owners during the distribution and the usage of the digital content. Efforts to resolve these issues have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management" ("DRM") herein.

Due to the expansion of the Internet in the recent years, and the issues relating to privacy, authentication, authorization, accounting, payment and financial clearing, rights specification, rights verification, rights enforcement, document protection, and collection of licensing fees DRM has become even more important. Because the Internet is such a widely used network whereby many computer users communicate and trade ideas and information, the freedom at which electronically published works are reproduced and distributed is widespread and commonplace.

Two basic types DRM of schemes have been employed to attempt to solve the document protection problem: secure-containers and trusted systems. A "secure container" (or simply an encrypted document) offers a way to keep document contents encrypted until a set of authorization conditions are met and some copyright terms are honored (e.g., payment for use). After the various conditions and terms are verfied with the document provider, the document is released to the user in clear form. Commercial products such as IBM's CRYTOLOPES™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. Nos. 5,530,235, 5,634,012, 5,715,403, 5,638,443, and 5,629,980 introduced many basic concepts of DRM. The disclosures of all of these patents are hereby incorporated herein by reference in their entirety. For example, U.S. Pat. No. 5,634,012 discloses a system for controlling the distribution of digital works. Each rendering device has a repository associated therewith. A predetermined set of usage transaction steps define a protocol used by the repositories for carrying out usage rights associated with the content. Usage rights are encapsulated with the content or otherwise associated with the digital content to travel with the content. The usage rights can permit various types of use such as, viewing only, use once, distribution, and the like. Rights can be granted based on payment or other conditions.

In conventional DRM techniques, a content owner, or other authorized party, specifies the rights after the content has been created and protects, e.g. encrypts, the content at the same time. A private key is used to encrypt the content, and a label is generated which specifies the usage rights. The rights label and the protected content are then associated and stored. A license to the content can later be generated for a user to permit the user to use or access the content. The license can include a private key which has been encrypted using a public key in known manner.

Conventional DRM systems fall short of presenting systems and processes for managing trusted communities.

SUMMARY OF THE INVENTION

An aspect of the invention is a system for managing use of digital content based on usage rights associated with the digital content, the usage rights being enforceable by a user device, said system comprising: an access list defining a trusted community of content users; a content device configured to associate content with the trusted community; a license device configured to issue a license to a user, wherein the license device is configured to receive a license request for the user to use the content associated with the trusted community, check the access list to determine if the user is a member of the trusted community with which the requested digital content is associated, issue a license to the user for use of the digital content if the user is a member of the trusted community with which the requested digital content is associated, and, if the user is not a member of the trusted community, execute a license request process specifying how to handle a license request for the user that is currently not a member of the trusted community.

DETAILED DESCRIPTION OF THE PREFERRED EMBODIMENT

The phrase "digital work" as used herein refers to any type of element having content in computer readable form. "Content" as used herein refers to the viewable or otherwise usable portion of a digital work. The phrase "usage rights" refers to manners of use which define permissions granted to a user of an existing digital work or a digital work to be created in the future with respect to use, access, distribution, and the like of the content of the work. In addition, one or more conditions may be specified which must be satisfied before the manners of use may be exercised.

Figure 1:
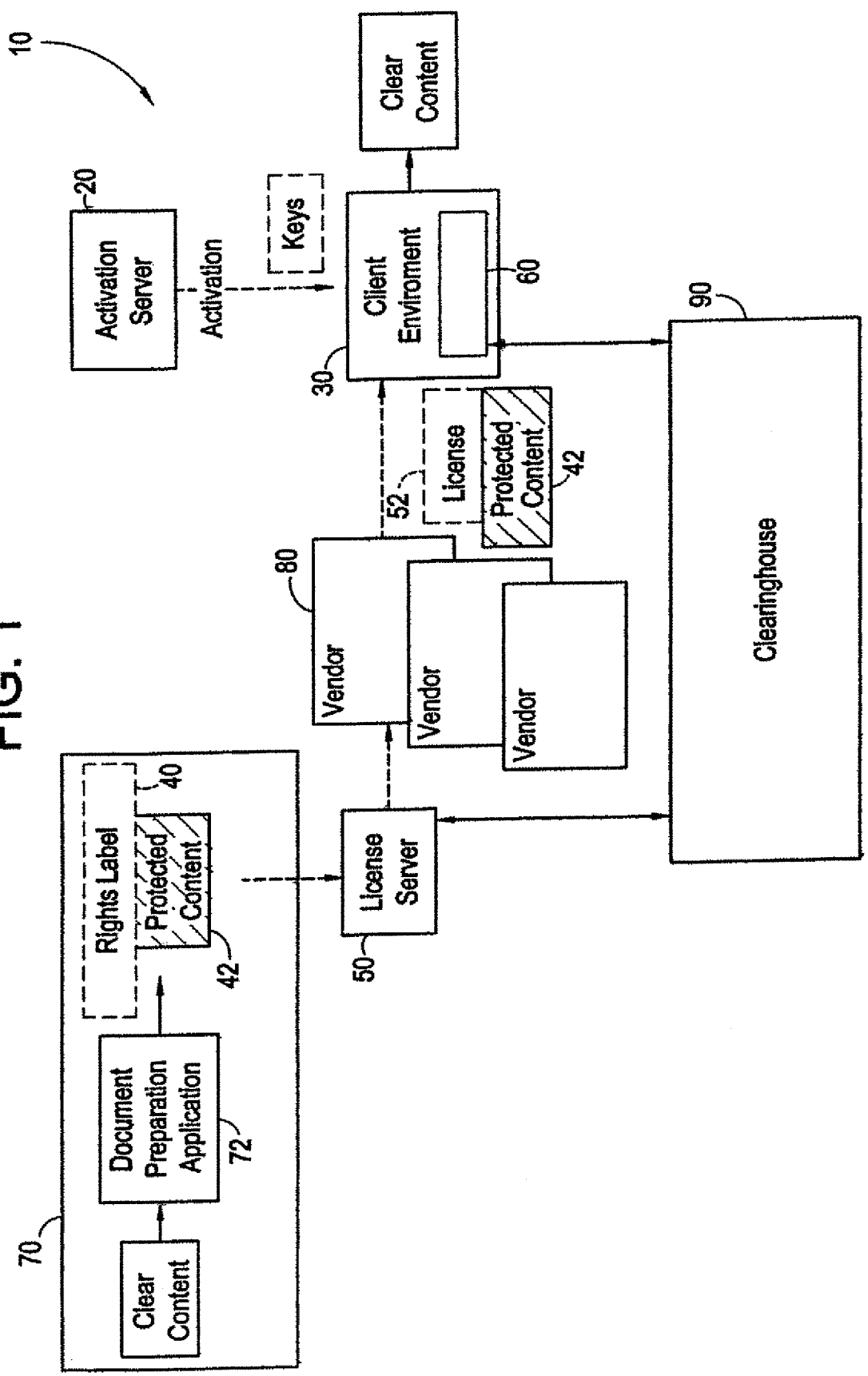
FIG. 1 is a schematic illustration of a DRM system.

A DRM system can be utilized to specify and enforce usage rights for items, such as digital content, goods or services. FIG. 1 illustrates a DRM system 10 that can be used to distribute digital content. DRM system 10 includes a user activation device, in the form of activation server 20, that issues public and private key pairs to content users in a protected fashion, as is well known. Typically, when a user goes through an activation process, some information is exchanged between activation server 20 and client environment 30, and software application 60 is downloaded and installed in client environment 30. Software application 60 serves as a security component and preferably is tamper resistant and contains the set of public and private keys issued by activation server 20 as well as other components such as any necessary engine for parsing or rendering protected content 42.

Rights label 40 is associated with protected content 42 and specifies usage rights that are available to an end-user when corresponding conditions are satisfied. License Server 50 manages the encryption keys and issues licenses 52 for exercise of usage rights in the manner set forth below. Licenses 52 embody the actual granting of usage rights to an end user based on usage rights selected from rights label 40. For example, rights label 40 may include usage rights for viewing protected 42 upon payment of a fee of five dollars and viewing or printing protected content 42 upon payment of a fee of ten dollars. Software application 60 interprets and enforces the usage rights that have been specified in license 52.

Figure 2:
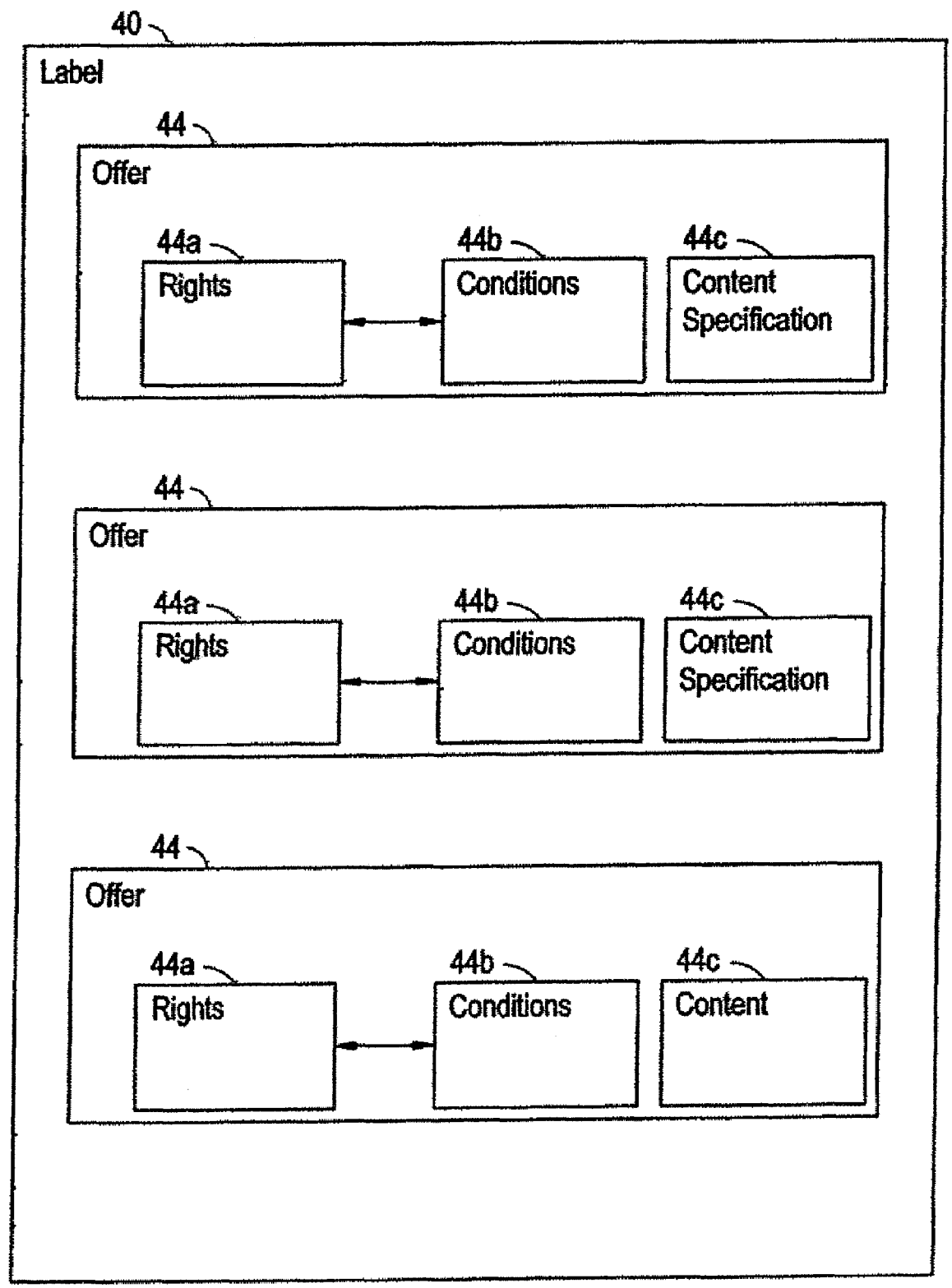
FIG. 2 is a schematic illustration of a rights label.

FIG. 2 illustrates rights label 40 in accordance with one embodiment. Rights label 40 includes plural rights offers 44. Each rights offer 44 includes usage rights 44a, conditions 44b, and content specification 44c. Content specification 44c can include any mechanism for referencing, calling, locating, or otherwise specifying protected content 42 associated with rights offer 44.

Figure 3:
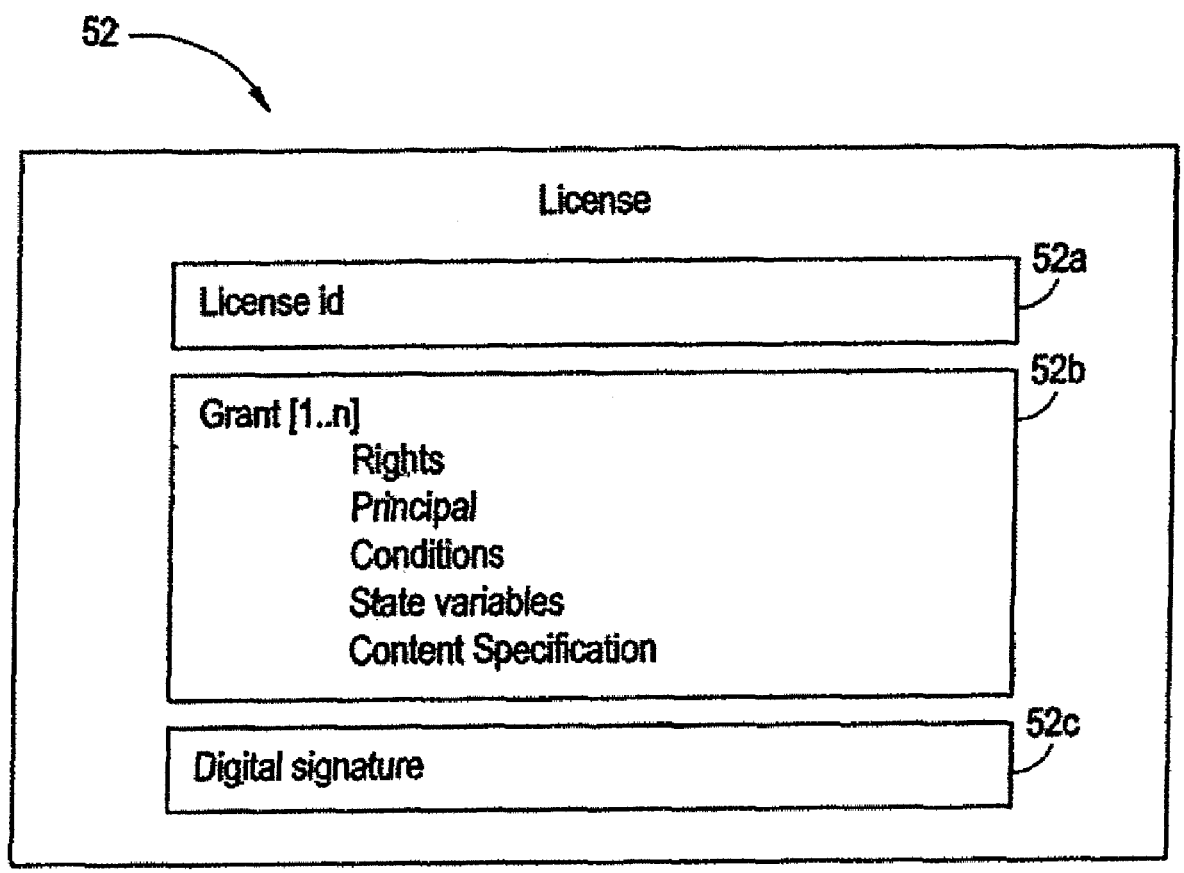
FIG. 3 is a schematic illustration of a license.

FIG. 3 illustrates license 52 in accordance with one embodiment. License 52 includes a unique license ID 52a and grant 52b including usage rights, a principal, conditions, state variables, and a content specification designating an associated protected content 42. License 52 also includes digital signature 52c including any cryptographic keys or the like for unlocking protected content 42.

Usage rights specify manners of use. For example, a manner of use ran include the ability to use protected content 42, in a specified way, such as printing viewing, distributing, or the like. Rights can also be bundled. Further, usage rights can specify transfer rights, such as distribution rights, or other derived rights. Such usage rights are referred to as "meta-rights". Meta-rights are the rights that one has to manipulate, modify, and/or derive other usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

As noted above, conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Usage rights and conditions can exist as separate entities or can be combined. Rights and conditions can be associated with any item including, objects, classes, categories, and services, for which use, access, distribution, or execution is to be controlled, restricted, recorded, metered, charged, or monitored in some fashion to thereby define a property right.

Protected content 42 can be prepared with document preparation application 72 installed on computer 70 associated with a content distributor, a content service provider, or any other party. Preparation of protected content 42 consists of specifying the rights and conditions under which protected content 42 can be used by associating rights label 40 with protected content 42 and protecting protected content 42 with some crypto algorithm or other mechanism for preventing processing or rendering of protected content 42. A rights language such as XrML™ can be used to specify the rights and conditions in rights label 40. However, the rights and conditions can be specified in any manner. Accordingly, the process of specifying rights refers to any process for associating rights with protected content 42. Rights label 40 associated with protected content 42 and the encryption key used to encrypt protected content 42 can be transmitted to license server 50. Protected content 42 can be a human readable or computer readable content specifying an item, a text file, a code, a document, an audio file, a video file, a digital mu media filer or any other content.

A typical workflow for DRM system 10 is described below. A user operating within client environment 30 is activated for receiving protected content 42 by activation server 20. This results in a public-private key pair (and some user/machine specific information) being downloaded to client environment 30 in the form of client software application 60 in a known manner. This activation process can be accomplished at any time prior to the issuing of a license.

When a user wishes to obtain a specific protected content 42, the user makes a request for protected content 42. For example, a user might browse a Web site running on Web server of vendor 80; using a browser installed in client environment 30, and request protected content 42. The user can examine rights offers in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causing both protected content 42 and license 52 to be downloaded. License 52 includes the selected usage rights and can be downloaded from license server 50 or an associated device. Protected content 42 can be downloaded from a computer associated with vendor 80, a distributor, or another party.

Application 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM system 10 addresses security aspects of protected content 42. In particular, DRM system 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic, of license 52. Of course, the example above is merely one way to effect a DRM system. For example, license 52 and protected content 42 can be distributed from different entities. Clearinghouse 90 can be used to process payment transactions and verify payment prior to issuing a license. Whereas DRM system 10 effectively addresses security aspects of protected content 42, the system is operable only when protected content 42 is in existence. DRM system 10 cannot readily provide protection to content that is not yet in existence, such as a video stream for a future event.

Figure 4:
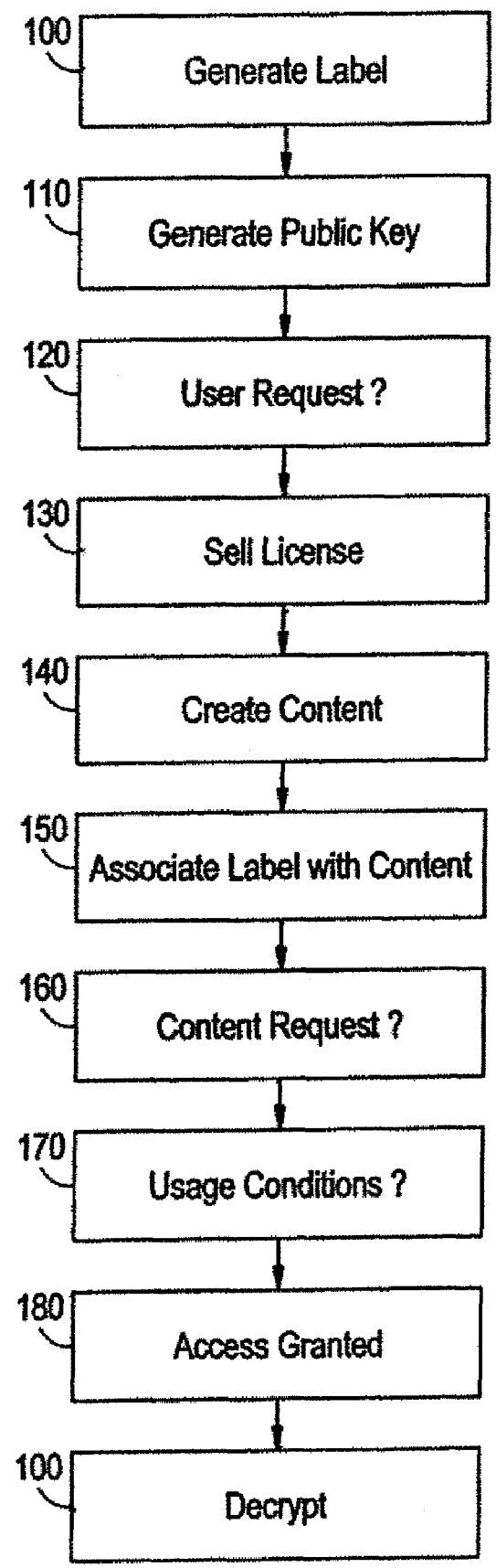
FIG. 4 is a flowchart of a method for providing usage rights for digital content before creation of the content in accordance with an embodiment of the invention.

FIG. 4 illustrates an embodiment of a method for providing usage rights for content of a digital work before the content is created. In step 100 a rights label specifying usage rights, to be associated with digital content that is not yet created, is generated. The rights label can include plural rights offers each specifying usage rights, such as the right to print, copy, after, edit or view the digital work or any other right, permission, or restriction, such as those contained in the XrML™ language or other usage rights grammar. In the case of using the XrML™ language, the rights label can be an extensible markup language (XML) document specifying the usage rights. In addition, the future content can have many different versions of usage rights and thus a label can be generated for each version. In step 110, a key, such as a conventional public key, is generated in a known manner and associated with the rights label.

In step 120, a user request for a license to use the content to be created is received. The request can include a selection of one of the offers in the rights label. Keep in mind that the content itself need not be in existence yet. For example, the content can be a video recording or stream of a sporting event to occur in the future. In step 130, a distributor of the content, or another authorized party, issues a license to the user. The license can include a private key corresponding to the public key generated in step 110 and may include usage rights or other descriptive data. Once again, keep in mind that the content itself need not be in existence yet. Accordingly, the distributor is able to sell a license to view the event prior to the event.

In step 140, the content is created. Of course, this step can be accomplished by another party. However the content is created, the salient point in the preferred embodiment is that the content somehow comes into existence after rights are assigned for it. After the content is created, the license is associated with the content in step 150. The license can be encapsulated with the content. Alternatively, the license can be stored separately from the content but be associated through links, flags, calls, references or the like. Therefore, the term "associated" as used herein refers broadly to creating a correspondence between the content and the license so the license will be applied to the content Once the license is associated with the content, the content is secured using the key generated in step 110. The digital content can be secured through any form of encryption or other known technique. For example pretty good privacy (PGP) encryption procedures can be used.

In step 160, the process determines whether there is a request for access to the secured digital content. If there are no requests, the process waits for a request. However, if there is a request for access, the process proceeds to step 170 where the usage rights associated with the digital work, i.e. usage rights in the license, are checked to determine whether all the conditions, such as payment, associated with the usage rights have been satisfied. If all the conditions have been satisfied, the process proceeds to step 180 in which access to the content is granted, i.e., the content is downloaded, streamed, or otherwise made accessible to the user. In step 190, the users private key is used to decrypt the content in a known manner.

The association of the usage rights with the content may occur in a variety of ways. For example, if the usage rights will be the same for the entire content of a digital work, the usage rights can be attached when the digital work is processed for deposit in a distribution server or other device. However, if the content of the digital work has a variety of different usage rights for various components, the usage rights can be attached as the work is being created. Various authoring tools and/or digital work assembling tools can be utilized for providing an automated process of attaching the usage rights. Because each part of a digital work can have its own usage rights, there can be instances where the usage rights of a "part" will be different from its parent. As such, conflict rules can be established to dictate when and how a right may be exercised in a known manner.

Figure 5:
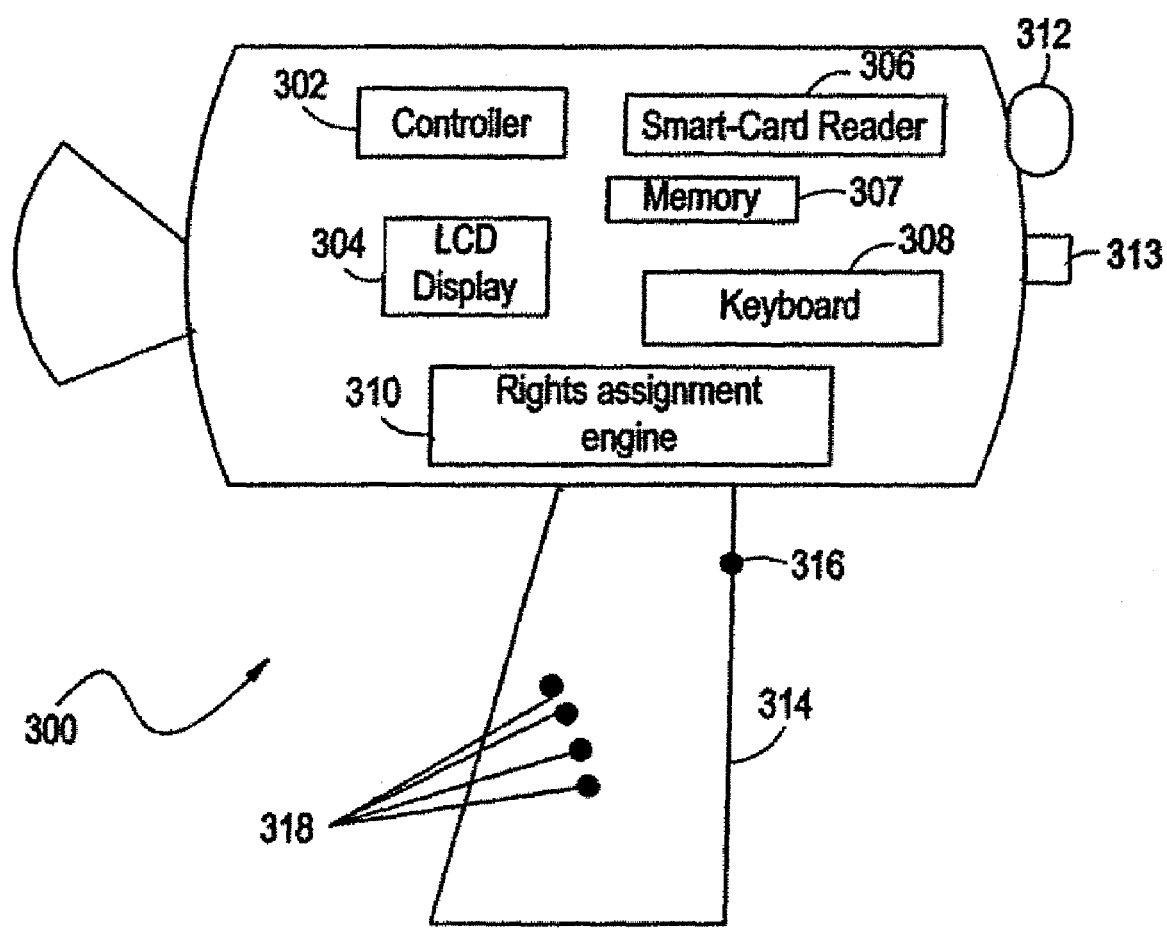
FIG. 5 is a content creation device for providing usage rights for digital content to be created in the future in accordance with an embodiment of the invention.

FIG. 5 illustrates a content creation device, a video recorder, in accordance with one aspect of the present invention. The content creation device 300 includes a controller 302, a LCD display 304, a smart-card reader 306, a memory 307, a keypad 308, a rights assignment engine 310, eye/iris recognition sensors 312, a cable connection 313, a handle 314, and symmetric finger print recognition sensors 316, 318. Also, lens system 320 permits recording of video images. Controller 302 and rights assignment engine 310 of the illustrated embodiment are accomplished through a microprocessor based device programmed in a desired manner.

While FIG. 5 shows the controller 302 and the rights assignment engine 310 as separate units, the functions performed by these units may be combined in one processor or may be further divided among plural processors such as digital signal processors and/or performed by dedicated hardware such as application specific integrated circuits (ASIC), e.g., hard-wired electronic or logic circuits or programmable logic devices, or other hardware or software implementations.

The smart-card reader 306 can be used for reading cards inserted therein. For example, a license or identification can be embedded in the card and communicated to the controller 302 and/or the rights assignment engine 310. LCD display 304, the smart card reader 306, keypad 308 and software interfaces constitute a user interface of creation device 300. The user interface permits a user to input information such as identification data, and access requests and provides feedback as to operation of creation device 300. The content creation device 300 of the preferred embodiment is a video recorder, however, it can be any type of recording device, or content creation device for example, a still-image camera, an animation generator, an audio recorder, a text processor, or the like.

The rights assignment engine 310 can be accessed via the cable connection 313. For example, a rights assignment computer of a digital rights management (DRM) system, as described in further detail below, can be coupled to the rights assignment engine 310 via cable connection 313 to download a usage rights label or template, similar to the label described above, indicating usage rights for content to be created by the content creation device 300 in the future. Any content created by the content creation device 300 will automatically be associated with the usage rights label or labels stored in rights assignment engine 310. Alternatively, the usage rights label can be composed using the user interface of creation device 300. In either case, one or more labels and corresponding keys generated and stored in rights assignment engine 310 along with instructions indicating how the labels are to be assigned to content created by creation device 300.

The instructions can cause the usage rights labels to be assigned in any manner and can include any permissions and/or restrictions. For example, in the case of a video recorder, each part of the video sequence or frames can selectively be assigned different rights. This makes the rights assignment process very flexible and dynamic and permits rights assignment to be made in real time as content is created or prior to creation.

The content creation device 300 can utilize a unique device ID, a users smart card, PKI technology, a PIN, or any biometrics system to assign rights based on the identity of the user, the recording device itself, the data on the smart card, or the like. For example, fingerprint recognition sensors 316, 318 or iris recognition sensor 312 can be used for recognition or authentication of the user's identify to permit rights assignment engine 310 to use a corresponding set of rights associated with the user. For example, all content recorded by person A will have one set of rights and all content recorded by person B will have a different set of rights. Of course, all these features, for example, fingerprint recognition sensors 316, 318 or iris recognition sensor 312, are optional features and content creation device 300 may be operated in a more conventional manner in other embodiments.

The content creation device 300 records content in a conventional manner. However, labels and keys generated in steps 100 and 110 described above are stored and associated with content recorded by content recorder 300 during or soon after recording. Accordingly, steps 140 and 150 described above are also accomplished by content creation device 300. For security purposes, a token or pre-paid card (or magnetic card and smart card, or any of its variations, such as memory-type or synchronous communication card, ISO 7816-compliant card, EMV-type card) can be used for the storage of fees and micro-payments, or keeping track of those fees with associated rights. Such cards can be read using the smart card reader 306. Again, however, these features are optional features and content creation device 300 may be operated in a more conventional manner in other embodiments.

It can be seen that the invention permits usage rights for a work to be created and associated with content prior to the creation of the content, the usage rights defining how the future digital work may be used and distributed. These pre-established usage rights become part of the future digital work and control the manner of use of the content of such work.

In the preferred embodiment, after the rights have been established for future content, a private key associated with the future content is assigned and a rights label is generated. This private key, along with the rights label, is stored. A user can purchase the content (present or future) after the label has been inserted into the main server. After the content is purchased, the content owner can get a license for encryption which contains the public key encrypted by a private key. Alternatively, a single symmetric key can be used.

The preferred embodiment allows a newspaper editor, for example, to send a camera crew to record content without worrying about the pictures being compromised in any way (for example, altered, edited, viewed by unauthorized personnel, or hidden and separately sold to another newspaper organization). In fact, the camera crew may have no rights whatsoever in the content as soon as the content is recorded.

Alternatively the editor can set the rights in such a way that the first 10 pictures, for example, will belong to the newspaper (work-related), and the next five pictures will belong to the cameraman (for personal use). This example illustrates the flexibility, security, confidence, certainty, and multiple relationships that can be arranged between parties (the cameraman and the editor in this example).

All future content may be assigned a content ID prior to existence of the content. Given the content ID information and the license for encryption, the content can be encrypted after creation in a manner that is available to be used by the users who have purchased the license. However, if the content ID information and the license for encryption are not available, access to the content shall be denied.

Further, a predetermined symmetric key can be generated in advance of content creation, and stored with the rights label. Afterwards, the same key can be used to encrypt the content once it is created. However, as noted above every user can receive a different key. In another alternative, the user can be given an authorization token, which the user can exchange for the license later on.

The controller 302 can process the security parameters and the rights management steps. Lost-card verification, lost-card reports, card-usage reports, security alert reports, and tracking reports can be associated or combined with the rights management reports, such as reports for revoked rights, denied rights, renewed rights, usage patterns, and micropayments.

The distribution, accounting, and other functions of the distributor and clearinghouse can be accomplished by any party on any device. For example, the content can be rendered on an ebook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

Figure 6:
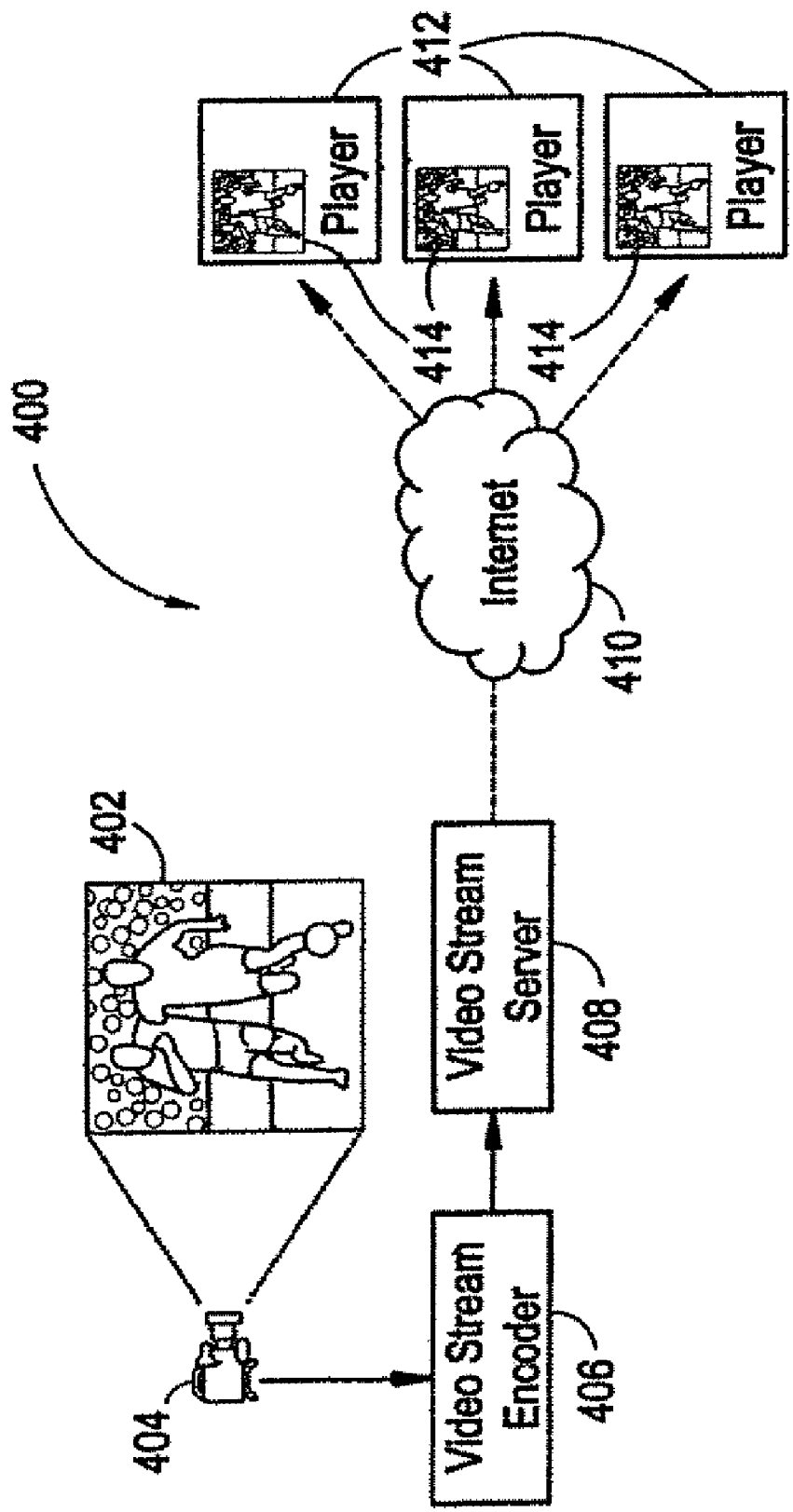
FIG. 6 is a schematic illustration of a conventional streaming media system.

FIG. 6 is a schematic illustration of a streaming media system 400 for streaming an event 402, such as a soccer match shown, or any other event. The media system 400 includes a capturing device which in the illustrated example, is a video camera 404 that captures event 402 and provides a video stream thereof. The video stream from the video camera 404 is received by an encoder device such as a video stream encoder 406 that converts the video stream into a streaming format such as Quicktime™, Real Media™ or Windows Media Player™. The converted video stream is provided to a streaming server 408 that serves the content via a network such as the Internet 410 to end users 412. The content is then viewed by the end users 412 using rendering application(s) that displays the video content on a display device 414. However, the streaming media system 400 does not allow protected distribution of the event 402 since a license is not required to view the event 402. Correspondingly, the streaming media system 400 also does not allow distribution of protected content. In addition, streaming media system 400 does not allow distribution of protected content if the content does not yet exist, such as is the case where the event is to occur in the future.

Figure 7:
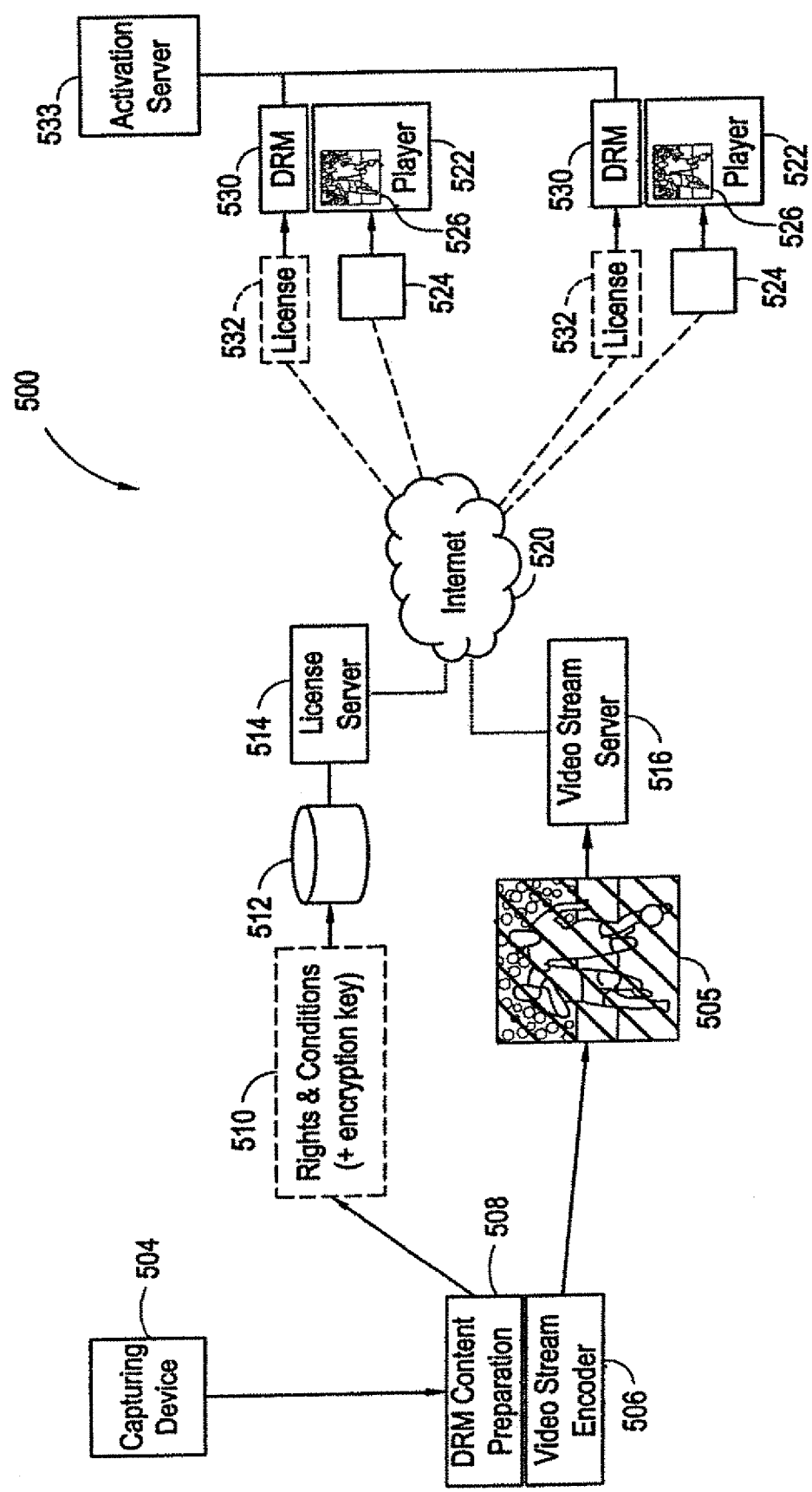
FIG. 7 is a schematic illustration of a DRM enabled streaming media system in accordance with one embodiment of the present invention.

Therefore, in accordance with one embodiment of the present invention, DRM-enabled streaming media system 500 is provided as shown in FIG. 7 where the streaming media, for instance, a video stream, is protected, and a license is required to view or access the content thereby allowing protected distribution of the content. It should be initially noted that whereas the terms "server" and "system" am used herein to describe the devices for implementing the present invention in the illustrated embodiments above, these terms should be broadly understood to mean any appropriate device for executing the described function, such as a personal computer, hand held computer, PDA, or any other general purpose programmable computer or combination of such devices, such as a network of computers. In addition, as previously noted, "content" can be a human readable or computer readable content, a text file, a code, a document, an audio file, a video file, a digital multimedia file, or any other content.

In the DRM-enabled streaming media system 500, the event is captured by the capturing device 504, thereby providing the content to be protected. The capturing device 504 may be a video camera of the type previously described relative to FIG. 5 or 6. The capturing device 504 provides captured video stream to a content preparation device 508 and a video stream encoder 506. The video stream encoder 506 is preferably integrated with the content preparation device 508 as shown.

The DRM content preparation device 508 which may be similar to the rights assignment engine 310 described relative to FIG. 5, generates a rights label 510 associated with the content to be created. The rights label 510 includes various rights associated with particular content, conditions that must be satisfied to access the content, and a content encryption key needed to decrypt the content. The rights label 510 is stored in a database 512 controlled by a license server 514. The license server 514 is adapted to issue licenses 532 based on offers selected from the rights label 510 for allowing use of protected content in the manner described further below. In addition, a video stream encoder 506 encrypts the content so that it becomes encrypted content 505 which is protected in the sense that content must be decrypted in order to use the content. Preferably, the video format is preserved even through encryption. The encrypted content 505 is provided to a video stream server 516 that hosts the encrypted streamed content. The video stream server 516 provides the encrypted content 505 to a network such as the Internet 520 to allow distribution to remote users 522.

Rendering devices 526 can, upon activation by an activation device such as the activation server 533, process the licenses 532 issued by the license server 514. The rendering application 524 is preferably integrated with the rendering devices 526 used by the users 522. The rendering application (s) 524 may be Quicktime™, Real Media™ or Windows Media Player™ that allow display of video content on rendering device 526, or other appropriate rendering application.

The activation server 533 is preferably used to generate public-private key pairs for the users 522 of the DRM system 500. Activation provides a means for authenticating the users 522 via presentation of an issued public key provided during the activation process. During the generation of the licenses 532, the public key of the users 522 received during the activation process are retrieved. The content encryption key provided in the rights label 510 is then encrypted using the users public key and delivered in the licenses 532. The only way to decrypt the content encryption key provided in the rights label 510 is by using the user's private key received during the activation process. Furthermore, the only way to decrypt the encrypted content is to use the decrypted content encryption key received in the rights label 510. When a user 522 attempts to view or play a video stream, a license 532 is issued by the license server 514 and sent to the DRM component 530 of the user 522. The license 532 contains the rights and content encryption key that may be decrypted using the users private key to allow decryption of the encrypted content 505. Once the encrypted content 505 is decrypted, normal viewing of the content is attained using the rendering application 524. Thus, by encrypting the content as well as the encryption key required to decrypt the content, the DRM system 500 ensures that only authored users are given access to the protected content.

Of course, depending on the specific implementation of the DRM system, other parties involved in the implementation of the DRM system 500 in addition to users 522 that actually consume content, may also need to be activated. For example, a point of capture that produces the content, content distributor, vendor such as a store front or an application that allows purchase and streaming of the content, may also need to be activated depending on the specific implementation in accordance with other embodiments.

Although the DRM system 500 shown in FIG. 7 discussed above can be used to support and distribute any type of protected content, the DRM system 500 shown, does not provide for assignment of rights to content that does not yet exist. Moreover, the DRM system 500 also does not provide for pre-distributing of licenses granting rights to view content before the existence of the content. Alternative embodiments of the DRM systems in accordance with the present invention discussed below address this limitation.

Figure 8:
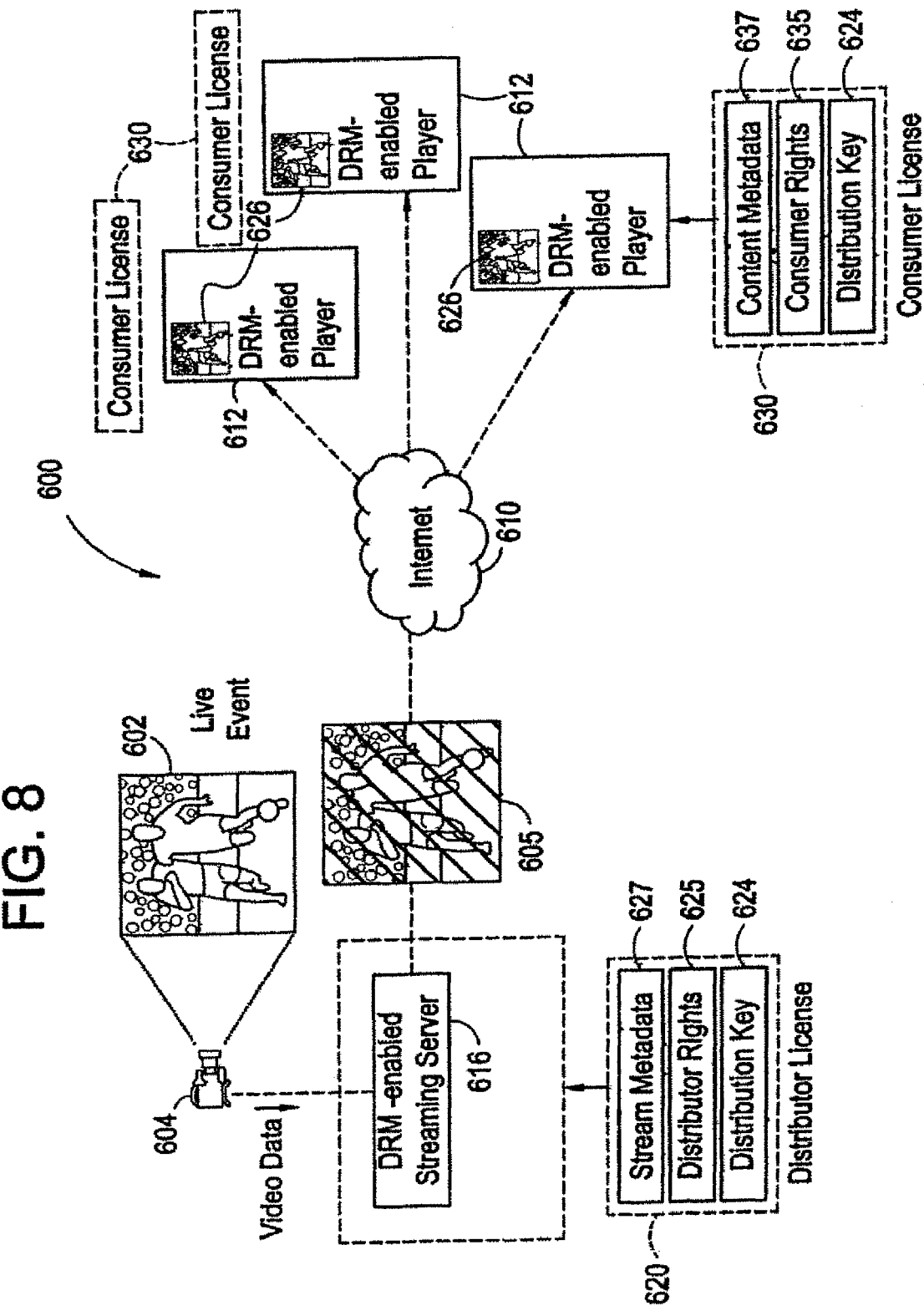
FIG. 8 is a schematic illustration of how the DRM system in accordance with one embodiment of the present invention is used to distribute a live event.

In particular, the preferred embodiment of a DRM system 600 in accordance with the present invention as schematically shown in FIG. 8 establishes a distributor license 620 with a distribution key 624 discussed in detail below to allow protection of content that does not yet exist such as a broadcast of a future live event, and also to allow the distribution of licenses in advance of the event. As seen in FIG. 8, a live event 602 is captured by capturing device such as a video camera 604, and captured video data is provided to a streaming device such as a streaming server 616. In accordance with the present embodiment, the streaming server 616 is authorized via a distributor license 620 to distribute the captured video stream as encrypted content 605 to users 612 via the Internet 610. The encrypted content 605 is decrypted by users 612 using consumer licenses 630 and video content is displayed on rendering devices 626 using a rendering application such as Quicktime™, Real Media™ or Windows Media Player™. It should be noted that in FIG. 8, various components of the DRM system 600 such as a content preparation device, video stream encoder, license server and activation server have been omitted for clarity. However, such components would function in a substantially similar manner as described relative to DRM system 500 of FIG. 7 discussed above.

As shown in FIG. 8, the distributor license 620 of the illustrated embodiment comprises a distribution key 624, distributor rights 625, and stream metadata 627. In a similar manner, the consumer license 630 of the illustrated embodiment comprises a distribution key 634, consumer rights 635, and content metadata 637. The distribution key 624 is a content encryption key that is generated in advance of the event and is associated with the rights and conditions that will apply to the future broadcasted content. The distribution key 624 is stored as a component of a rights label in a license server as discussed in further detail relative to FIGS. 9 to 11 below. As will be evident to one of ordinary skill in the art in view of the teachings presented below, the distributor license 620 and the consumer license 632 are generated and issued to authorized end users prior to, or even during, the live event.

Figure 9:
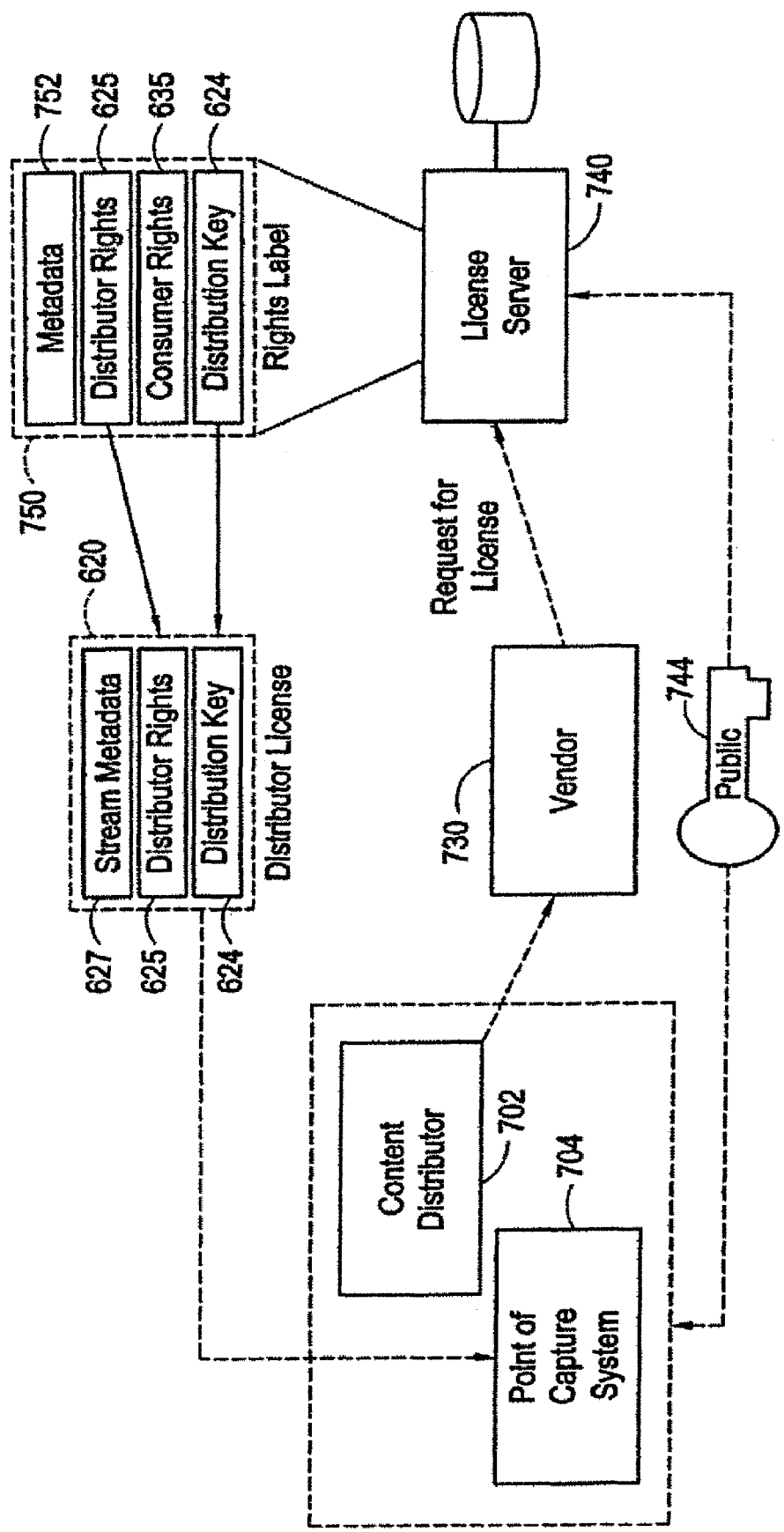
FIG. 9 is a schematic illustration showing the generation of a distribution license in accordance with one embodiment of the present invention.
Figure 10:
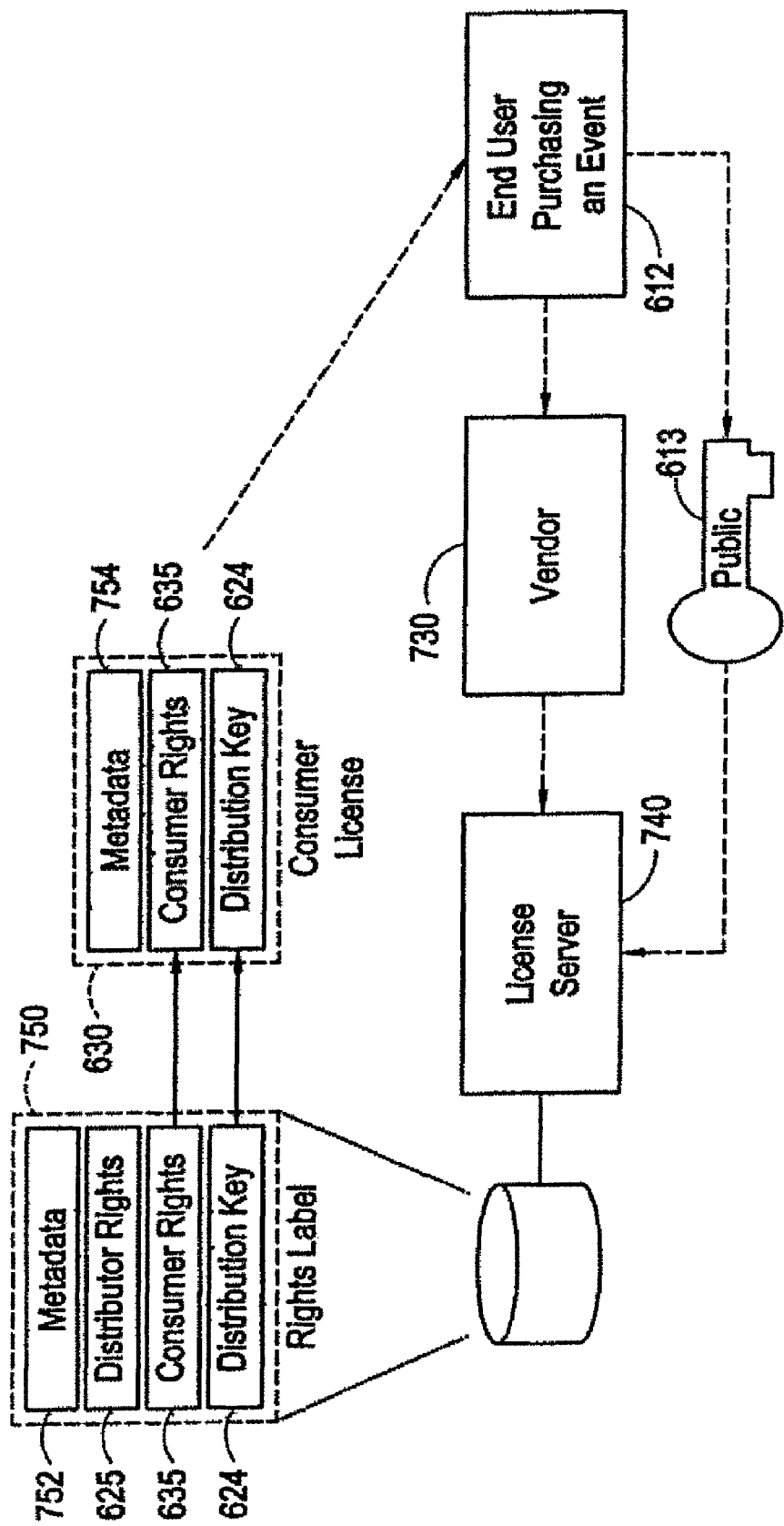
FIG. 10 is a schematic illustration showing the generation of a consumer license in accordance with one embodiment of the present invention.

FIG. 9 is a schematic illustration showing the generation and retrieval of the distributor license 620 of FIG. 8 in accordance with one embodiment of the present invention. As previously noted, the distributor license 620 can exist prior to the event to protect captured event content through encryption, and to distribute the protected content to the users 612. A content distributor 702 owns rights to the captured content, and in the present example, may be a broadcaster or the entity that owns the copyright for the broadcast. A point of capture system 704 is a system used to capture the event and prepare the content for distribution through a streaming device such as streaming server 616 discussed above. Point of capture system 704 may comprise a capturing device such as the video camera 504, the content preparation device 508, and/or the video stream encoder 506 discussed previously relative to FIG. 7. These components have been omitted in FIG. 9. Of course, in other embodiments, alternative appropriate devices may also be used.

It should also be noted that the point of capture system 704 which captures the event can be directly associated with the content distributor 702 as shown in FIG. 9, for instance, where the content distributor 702 controls or owns the point of capture system 704. However, in other embodiments, the point of capture system 704 may be a separate entity not associated with the content distributor 702.

A vendor 730 runs a web site, such as an on-line store front, where access to the event is sold and/or otherwise obtained by users. After some transaction by an end user such as log-in, payment, etc., a request to use protected content associated with a future event is made. The content distributor 702, the vendor 730 or equivalent, requests issuance of an appropriate distribution license 620 associated with the requested future event to the license server 740.

The license server 740 is provided with a public key 744 from the point of capture system 704, and is responsible for issuing both the consumer license 630 and the distribution license 620 from the rights label 750 stored in the license server 740. The rights label 750 includes metadata 752, distributor rights 625, consumer rights 635, and the distribution key 624 as shown. In a manner similar to that previously described, the distribution key 624 itself is encrypted using the public key 744 from the point of capture system 704. Thus, the distribution key 624 itself, must be decrypted so that the distribution key 624 can be used to decrypt protected content. Further details regarding generation of the distribution key 624 is discussed relative to FIG. 11. Metadata 752 is included in the rights label 750 that may be used for authentication purposes. The distributor rights 625 may include meta-rights such as rights to offer, grant, obtain, transfer, delegate, track, surrender, exchange, and revoke usage rights to/from others. Meta-rights can also include the rights to modify any of the conditions associated with other rights. For example, a meta-right may be the right to extend or reduce the scope of a particular right or the validation period of a right.

As shown, the distribution key 624 and the distributor rights 625 of the rights label 750 are used to generate the distributor license 620, the distributor license 620 being completed by inclusion of a stream metadata 627. In the present example, the distributor license 620 is provided to the content distributor 706 to allow distribution of the content, and to point of capture system 704 to allow encryption of the content. In this regard, the distribution license 620, and in particular, the distribution key 624 in the generated distribution license 620, is used to encrypt the captured event by the point of capture system 704, for instance, video or audio stream of the event.

The actual locale where the protection occurs depends on the implementation of the point of capture system 704. In the example where the DRM system in accordance with the present invention is used to encrypt a video stream, the encryption of the video stream may occur anywhere along the stream creation workflow prior to distribution via the Internet 610 of FIG. 8, or other distribution channel. Additional security measures such as protection of the video data from the capturing device 604 to the streaming server 616 may also be provided.

FIG. 8 illustrates generation of the consumer license 630 shown in FIG. 8 in accordance with one embodiment of the present invention, the consumer license 630 being required for users to use the protected content such as to view video stream of an event. Typically, in implementing a DRM-enabled distribution system in accordance with the present invention, an end user 612 seeking to purchase protected content accesses the vendor 730, which may be an on-line storefront or a web site. As previously noted, the vendor 730 provides the access point for consumers such as end users 612 to purchase content which is not yet available, but will be available at a predetermined date, for instance, a future event.

When attempt is made by the end user 612 to purchase protected content, the public key 613 of the end user 612 which was previously obtained through an activation process, is sent to the license server 740. The license server 740 uses the public key 613 to encrypt the distribution key 624 required to decrypt the protected content, and generates the consumer license 630 using components of the rights label 750. In particular, the consumer rights 635 and the distribution key 624 are used to generate the consumer license 630, the consumer license 630 being completed by inclusion of the metadata 754 that may be used for authentication purposes. The license 630 can then be downloaded by the end user 612 and used for accessing the scheduled future event.

The above described process for obtaining a consumer license 630 by the end user 612 is somewhat similar to conventional DRM systems. However, in contrast to conventional DRM systems, the obtained consumer license 630 cannot be used for any present content, but instead, serves as a "ticket" for a future event which may be a live event. The consumer license 630 is generated in accordance with the consumer rights 635 that have been specified to the end user 612. Thus, in the manner described above, the license server 740 of the preferred embodiment makes a distinction between the rights specified for the distributor and the rights specified for the consumer to generate a distributor license 620 or a consumer license 630 accordingly.

Figure 11:
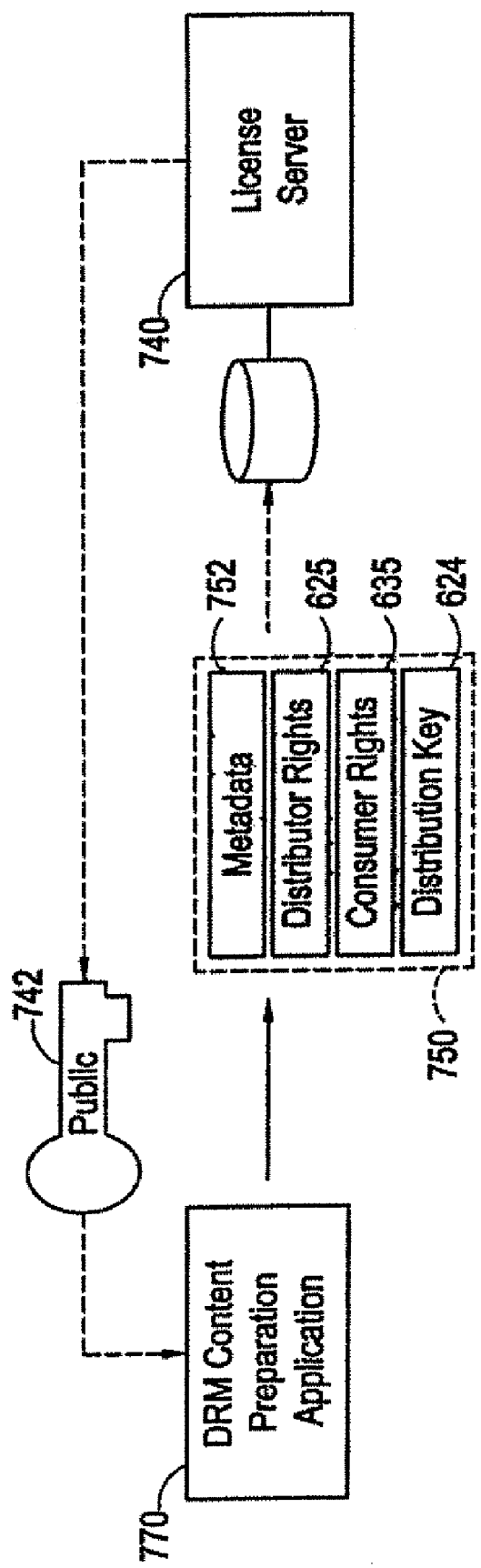
FIG. 11 is a schematic illustration showing the generation of a distribution key in accordance with one embodiment of the present invention.

FIG. 11 is a schematic illustration showing the generation of the distribution key 624 that is a component of the rights label 750 in accordance with one embodiment of the present invention. The distribution key 624 is required for generating the distribution license 620 and the consumer license 630 which are necessary for distributing and allowing use of protected content that is to occur in the future, such as a future event. Through a software application, the content distributor 702 initially creates the distribution key 624, which is a symmetric encryption key. The distribution key 624 is protected from tampering by encrypting it with the license server's 740 public key 742 so that only the license server 740 will be able to decrypt the distribution key 624. In this regard, the distribution key 624 is preferably stored in the license server 740 in order to provide better security and to track its use.

Moreover, as previously noted, additional metadata 752 is created and stored in the rights label 750. This metadata 752 is later inserted into the header information of the video stream that is generated by the point of capture system 704 during the live event. This metadata 752 may be used by the end users 612 to authenticate the issued licenses. The rights label 750 is transferred and stored in the license server 740 and may also be updated therein. The distribution key 624 is then issued as a component of the distributor license 620 and/or the consumer license 630 to a distributor and/or end user 612, respectively, in the manner described relative to FIGS. 9 and 10. The above described process is somewhat similar to processes used in conventional DRM systems except that the distribution key 624 is not immediately used to protect or use contents but it is saved for later use when the protected content is to be distributed closer to the time of the actual future event.

The following describes an example workflow that may be used to operate a DRM system in accordance with one embodiment of the present invention as applied to protected distribution and viewing of a future event. Thus, FIGS. 7 to 11 and various components identified therein should be referenced to facilitate understanding of the workflow. Initially, the content distributor 702 decides to offer a future event for sale, for instance, a future sporting event. The content distributor 702 creates the distribution key 624 which is a symmetric encryption key. The distribution key 624, together with additional information including distributor rights 625 and metadata 752 is encoded in rights label 750. The rights label 750 is then transferred to the license server 740 at which the consumer rights 635 is also added to the rights label 750.

The vendor 730 which may be a storefront or a web site, offers for sale the right to view the future event. End user(s) 612 desiring to use or otherwise view the future event, accesses the vendor 730 via the Internet 610 to purchase, or otherwise obtain, the right to view the future event. During the purchasing transaction, the vendor 730 interacts with the license server 740 to generate the consumer license 630 in the manner described above relative to FIG. 10 from rights label 750 so that the end user 612 can download the consumer license 630 to the users 612 rendering device 626 or any other appropriate device such as a computer, hand held device, etc. for future use in viewing the event.

During this time when the right to view the future event is offered for sale via the vendor 730, but prior to the start of the actual event, the content distributor 702 requests for the distributor license 620, which is issued by the license server 740 in the manner described above relative to FIG. 9. The distributor license 620 is then used by the point of capture system 704 to protect the content while capturing the live performance of the event, for instance, the sporting event 602. The point of capture system 704 processes the video data from the capturing device 604 on-the-fly, and transmits now protected content 605 to the streaming server 616.

Once the distribution license 620 and the consumer license 630 are issued, the event can be securely distributed and consumed by authorized audience, i.e. end users 612. The streaming server 616 provides now protected content 605 through the Internet 610, or other appropriate distribution mechanism, to every user 612 that has purchased the right to view the event. User 612 decrypts the encrypted distribution key 624 provided in the consumer license 630 to decrypt the protected content 605. User's 612 rendering device 626 (FIG. 8) includes a rendering application such as Quicktime™, Real Media™ or Windows Media Player™ so that user 612 can view the event.

A typical workflow for DRM system 10 is described below. A user operating within client environment 30 is activated for receiving protected content 42 by activation server 20. This results in a public-private key pair (and some user/machine specific information) being downloaded to client environment 30 in the form of client software application 60 in a known manner. This activation process can be accomplished at any time prior to the issuing of a license.

When a user wishes to obtain a specific protected content 42, the user makes a request for protected content 42. For example, a user might browse a Web site running on Web server of vendor 80, using a browser installed in client environment 30, and request protected content 42. The user can examine rights offers 44 in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causes both protected content 42 and license 52 to be downloaded. License 52 includes the selected usage rights and can be downloaded from license server 50 or an associated device. Protected content 42 can be downloaded from a computer associated with vendor 80, a distributor, or another party.

Application 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM system 10 addresses security aspects of protected content 42. In particular, DRM system 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic, of license 52. Of course, the example above is merely one way to effect a DRM system. For example, license 52 and protected content 42 can be distributed from different entities. Clearinghouse 90 can be used to process payment transactions and verify payment prior to issuing a license.

In DRM system 10 discussed above, end user's rights to protected content are granted to each end user through a license. However, granting licenses to a particular individual may become cumbersome to use when the protected content is to be used by a large number of individuals. For example, granting licenses to each individual of an organization can become a difficult task due to the possibly large number of employees of the organization who are end users that require access and use of the protected content. In addition, in such larger organizations, employees often change their roles within the organization, others leave the organization, or others join the organization. Any such change for end users may have associated change in authorization and access requirements to the protected content.

Monitoring records of each end user authorized to use and access the protected content, and issuing each end user a license may become a very difficult and cumbersome task for large number of individuals. Therefore, a DORM system that avoids the noted disadvantage, and facilitates issuance of a license to authorized end users is desirable.

Figure 12:
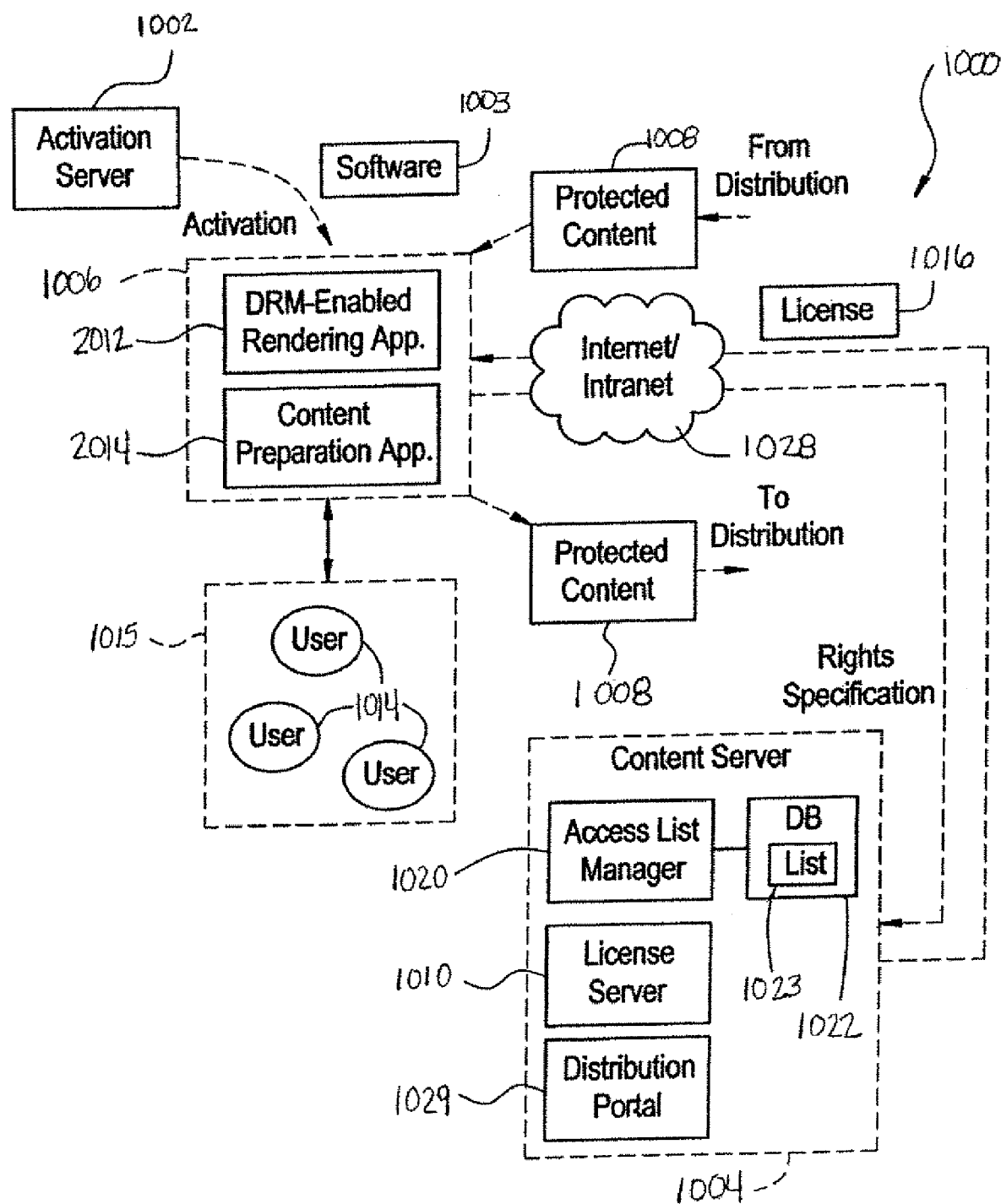
FIG. 12 is a schematic illustration of a DRM system in accordance with an embodiment.

DRM system 1000 in accordance with another embodiment is illustrated in FIG. 12. DRM system 1000 facilitates issuance of a license as well as monitoring and maintenance of end users 1014 that are authorized to access and use protected content 1008. In particular, DRM system 1000 creates groups of end users in trusted community 1015 described in further detail below that is associated to a particular protected content 1008. An end user 1014 in trusted community 1015 is automatically issued license 1016 required to access and use protected content 1008.

Protected content 1008 is registered with, and managed by a content device such as content server 1004 in a manner described in further detail below. Because protected content 1008 is encrypted, it cannot be used by end user 1014 without proper license 1008 and software. In this regard, DRM system 1000 includes an activation device such as activation server 1002 that is adapted to issue software package 1003 to a user device, such as client 1006, during an activation process. Software package 1003 allows end user 1014 to use protected content 1008. Activation server 1002 of DRM system 1000 also provides a public and private key pair to the user device, such as client 1006, each end user 1014 having an identifier such as an email address, a public key, or other identifier that allows recognition of end user's 1014 identity.

Content device such as content server 1004 of DRM system 1000 also includes a license device, such as license server 1010, that is adapted to issue license 1016 for end user 1014 having usage rights which are associated with protected content 1008. License 1016 defines end user's 1014 rights regarding protected content 1008. Requests for license 1016 from license server 1010 are made through network 1028 such as Internet or intranet by end user 1014 via client 1006. Distribution portal 1029 that facilitates distribution of protected content 1008 and license 1016 from content server 1004 to end user 1014 may be implemented as an application through a web site, an online store, or in another appropriate manner.

When a license device such as license server 1010 issues requested license 1016, distribution portal 1029 conveys license 1016 to end user 1014. In one embodiment, license 1016 can be made part of protected content 1008 and delivered to end user 1014 with protected content 1008. However, license 1016 may also be a separate file or other component with a mechanism to associate the file to the appropriate protected content 1008. For example, a link, a call or other association mechanism can be used.

Client 1006 receives software 1003 package from activation server 1002, receives protected content 1008 and license 1016 associated thereto from content server 1004, and allows one or more end user 1014 to access protected content 1008 for which end user 1014 is authorized.

In order to address the limitations noted previously and to facilitate issuance and management of licenses to plurality of end users 1014, DRM system 1000 utilizes a list of identifies authorized to use protected content 1008. Thus, content server 1004 of DRM system 1000 is provided with an access list managing device such as access list manager 1020 that maintains access list 1023 stored in database 1022. Access list 1023 is associated to protected content 1008 and comprises identifications of end users 1014, who are authorized to access and use protected content 1008. The end users identified in access list 1023 form trusted community 1015 where any end user in the trusted community 1015 associated to access list 1023 is to be given rights to protected content 1008.

Access list managing device such as access list manager 1020 is also adapted to recognize the identity of each end user 1014 in trusted community 1015 and to compare identity of end user requesting protected content 1008 with the authorized end users identified in the access list 1023. When distribution portal 1029 requests a license on behalf of a particular end user, for instance, end user 1014 who is also identified in access list 1023, access list manager 1020 requests license server 1010 to issue the requisite license 1016 so that the requesting end user 1014 can access and use protected content 1008.

In the illustrated embodiment of FIG. 12, DRM system 1000 can be used in the following manner. First, protected content 108 is associated with access list 1023 in database 1022 by access list manager 1020. Access list 1023 sets forth identities of end users 1014 in trusted community 1015 that are to be given access to protected content 1008. Then, requesting end user 1014 utilizes client 1006 activated by server 1002, to request access to protected content 1008 via distribution portal 1029. During the request process, a series of steps may be provided to ensure identity of end user 114 requesting access, such as logging in using an identifier such as account name and password, or any other appropriate manner.

Distribution portal 1029 submits the request of end user 1014 through client 1006, to access list manager 1020 of content server 1004. Access list manager 1020 compares the identity of requesting end user 1014 to identities of end users in access list 1023 stored in database 1022 which is associated to the requested protected content 1008. When access list manager 1020 confirms that the identity of requesting end user 1014 is present in access list 1023, it requests license server 1010 to issue a license 1016 to allow end user 1014 to access protected content 1008. If identity of an end user requesting access to protected content 1008 is not in access list 1023, this means that the end user requesting access is not part of trusted community 1015, and thus, should not be given access to protected content 1008. Consequently, no request for a license is sent to license server 1010 in such an instance thereby preventing the unauthorized end user from gaining access to protected content 1008.

The request for licenses may be executed using an API or by any other appropriate mechanism or protocol. Upon receiving the request to issue license 1016, license server 1010 then issues license 1016, and delivers license 1016 to distribution portal 1029 for delivery to end user 1014 that requested access. License 1016 is delivered to client 1006 so that end user 1014 can readily access and use protected content 1008. In this regard, client 1006 includes rendering application 2012 that allows protected content 1008 to be used or otherwise consumed by authorized end user 1014, i.e. an end user that is granted license 1016. Rendering application 2012 would typically be received by client 1006 from activation server 1002 during the activation process with software 1003. Rendering application 2012 may be a word processing document if protected content 1008 is a document a multimedia player if protected content 1008 is a multimedia file, and so forth.

As also shown in the embodiment of FIG. 12, client 1006 of DRM system 1000 includes content preparation application 2014 that allows administrators in control of DRM system 1000 to generate protected content such as protected content 1008 from unprotected clear content in the manner previously described relative to FIG. 1. In particular, content preparation application 2014 allows various rights for a particular content to be specified and content to be encrypted. The generated protected content may then registered with content server 1004 where protected content is uploaded to content server 1004 and associated to access list 1023 by access list manager 1020 in the manner previously described. As previously noted, various information may be required to register protected content 1008 into content server 1004. In one implementation, administrators that create protected content may be required to have a valid account with content server 1004 in order to register content therein. Moreover, as also previously noted, various information regarding the content, and e-mail address of administrators that registered content into content server 1004 may also be required.

Figure 16:
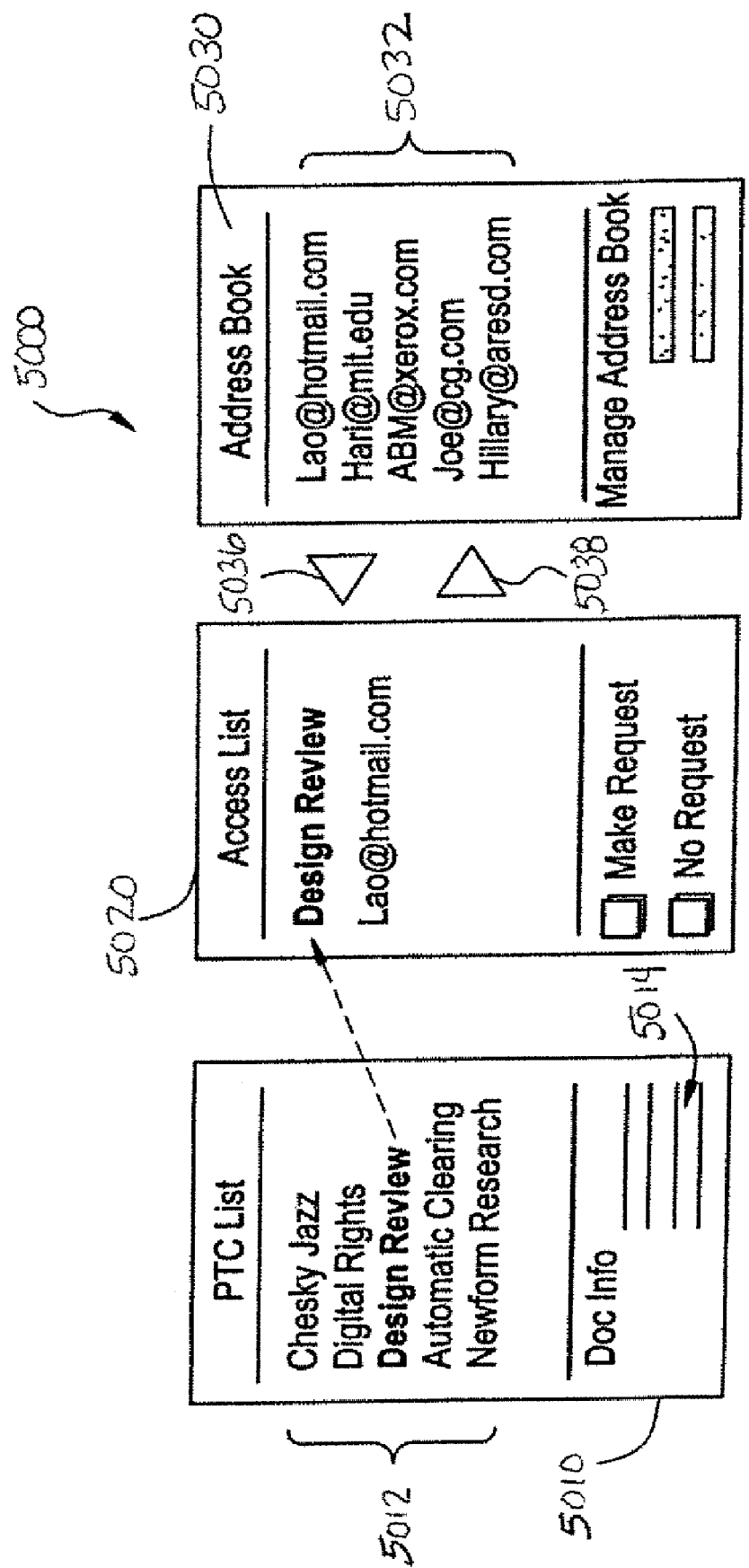
FIG. 16 illustrates a sample date structure user interface.

A significant advantage of DRM system 1000 in accordance with the illustrated embodiment is that it allows administrators of organizations and/or DRM system 1000 to maintain and manage access list 1023 so that end users can readily be added to or deleted from trusted community 1015, one method being described in further detail below and also relative to FIG. 16. Therefore, for example, as employees of a company move departments or leave the company, their respective membership in any given trusted community can also readily be changed. In addition, automation of license issuance is facilitated since the decision to issue license 1016 may be substantially automated using access list manager 1020 that verifies presence of end users identification in access list 1023.

It should be noted that in the above discussed DRM system 1000 of FIG. 12, only one protected content 1008 was discussed for example purposes only. In actual implementation, DRM system 1000 may be used to manage numerous protected content that are registered into content server 1004. Each of the registered protected content would then be associated with an access list stored in database 1022 and managed by access list manager 1020. Whereas the illustrated embodiments show access list manager 1020 as a component of content server 1004 that substantially automates management of access list 1023, it should be noted that human oversight and control may be used as desired, for instance, by an administrator for client server 1004. In other embodiments, functions of access list manager 1020 may be manually performed by an administrator or the like.

Registration of all protected content into content server 1004 may require provision of various information regarding each protected content, and may also optionally require entry of an e-mail address of the creator of each protected content, As discussed above, access to each of the registered protected content is determined by whether or not the end user requesting access to the protected content is part of the trusted community associated to the protected content. Content server 1004 may also be provided with ancillary features that allow administrative facilities to view, edit, delete and update rights labels associated with each of the protected content.

Moreover, it should also be noted that in the above discussed DRM system 1000 of FIG. 12, access list 1023 stored in database 1022 and managed by access list manager 1020 was associated with only one protected content 1008 for example purposes only. In actual implementation, access list 1023 that defines trusted community 1015 may be associated to one or more protected content. This is especially advantageous in the instance where same group or groups of end users are to be given access to a plurality of protected content. Thus, DRM system 1000 may be used to manage numerous protected content that is registered into content server 1004, and to manage access lists that are associated with one or more protected content.

In addition, as previously noted, distribution portal 1029, which is merely schematically shown in FIG. 12, may be a computer application or a storefront such as a web based, on-line store or vendor. In other embodiments however, distribution portal 1029 may be a computer application that is integrated with a mail server, license server 1010, or content server 1004.

Maintenance of access list 1023 in database 1022 by access list manager 1020 could be as simple as storing email addresses, cookies, or public keys associated with the end user 1014. Such embodiments are especially advantageous in an enterprise such as a organization, company or entity, where content server 1004 may be implemented using email addresses as identities of end users so that various distribution lists that are likely to already be present and used in the organization may be considered or be adapted for use as access list 1023 by associating R to protected content 1008. In the above manner, DRM system 1000 in accordance with the present invention facilitates issuance of a license to access and use a protected content, and also facilitates monitoring and maintenance of those end users that are to have such access.

Figure 13:
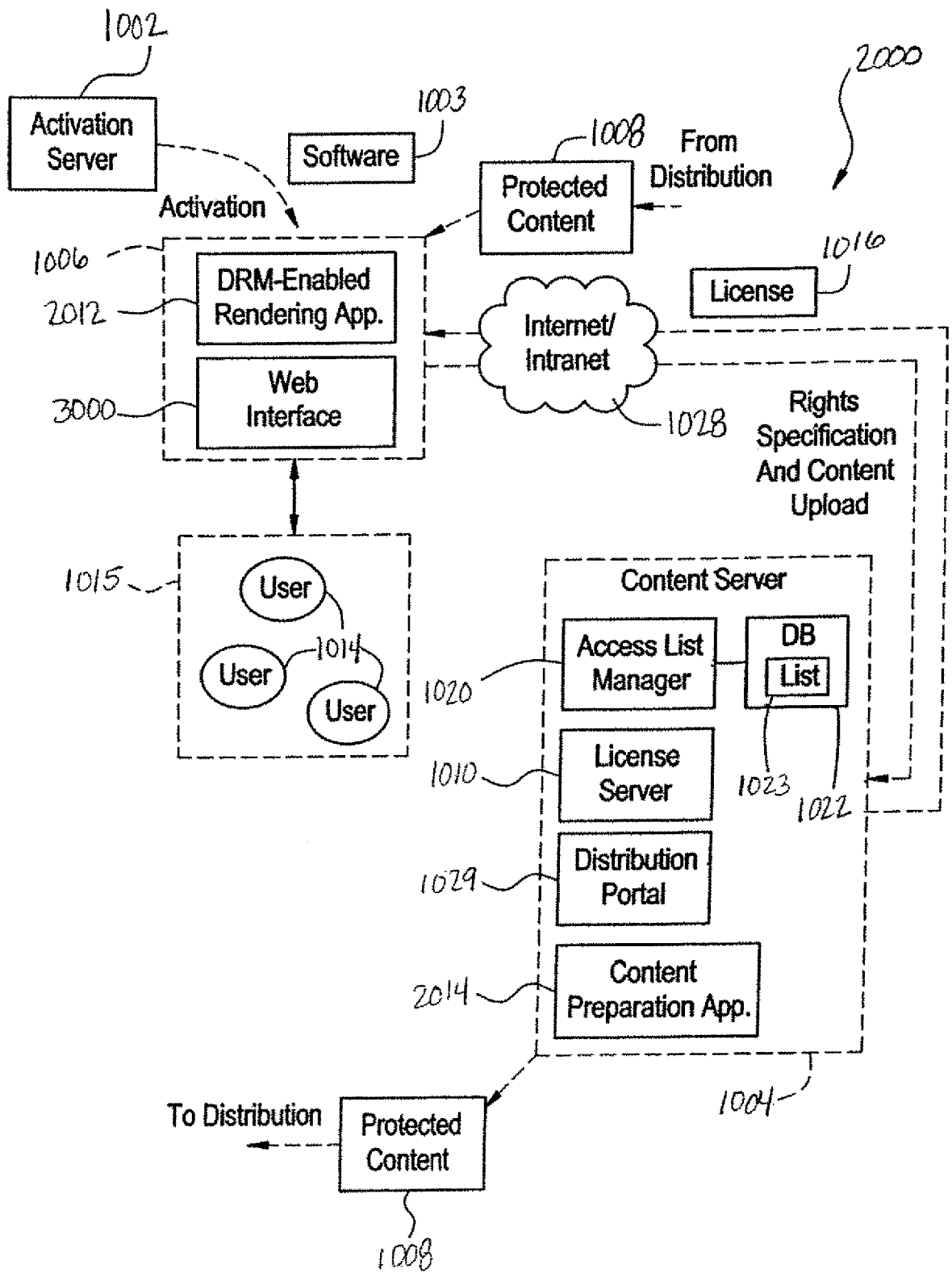
FIG. 13 is a schematic illustration of a DRM system in accordance with another embodiment.

FIG. 13 is schematic illustration a DRM system 2000 in accordance with an alternative embodiment. As shown, this embodiment is substantially similar to applications shown in FIG. 12 discussed above. Consequently, common numerals have been used for common components. In contrast to DRM system 1000, in ORM system 2000 of FIG. 13, content preparation application 2014 is provided as a component of content server 1004 and provides protected content 1008 for distribution as shown In the above embodiments, the physical locale of various components is not important as long as their functions are retained, especially since network 1028 allows transfer of data and instructions between the various applications and devices. In this regard, in the implementation of FIG. 13, client 1006 is also provided with web interface 3000 that facilitates such transfer of data and instructions between content server 1004 and client 1006 via network 1028. Thus, various embodiments of DRM system of the present invention such as those shown in FIGS. 12 and 17 are merely examples of how the present invention may be implemented.

Figure 14:
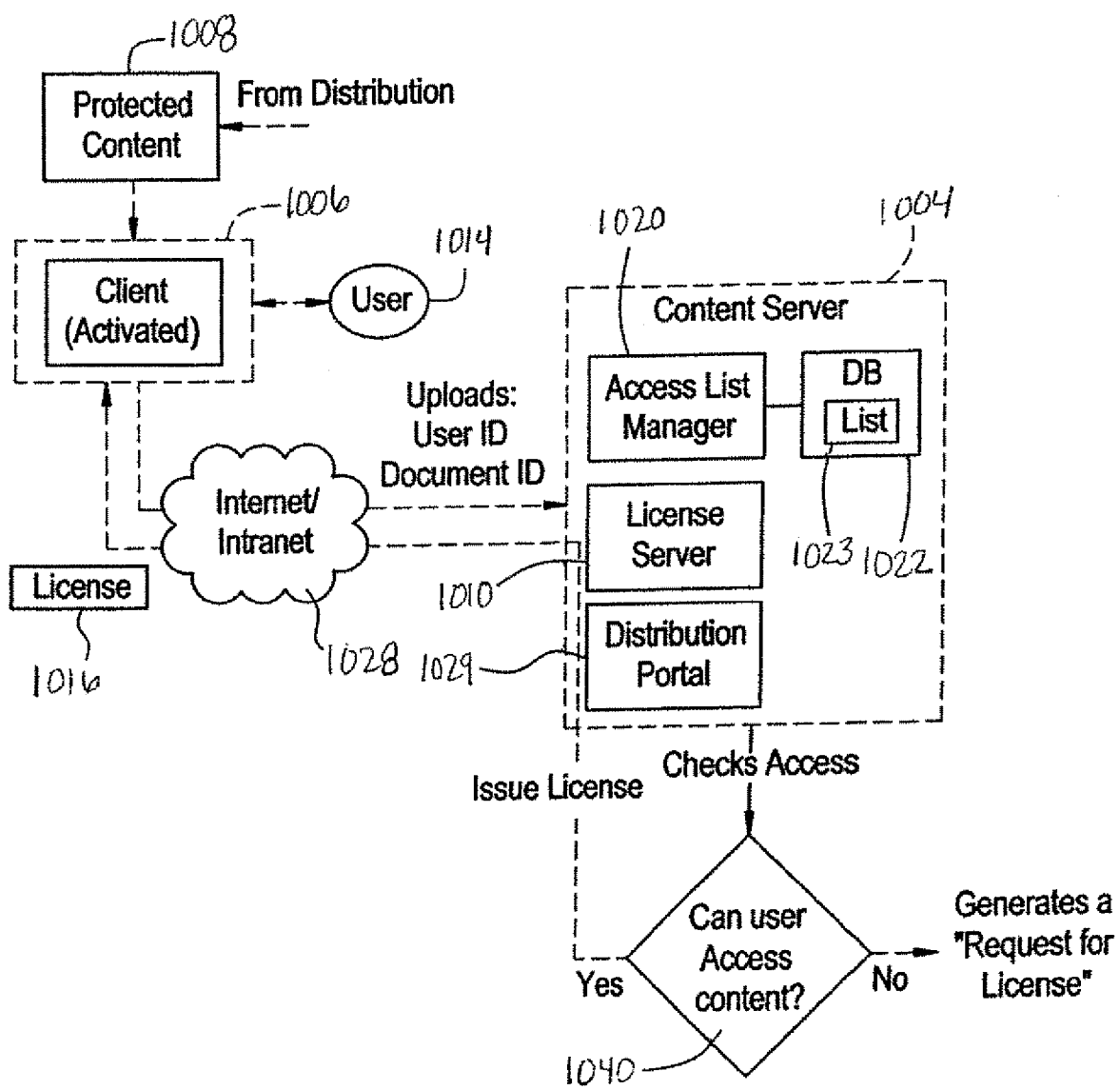
FIG. 14 is a schematic illustration of license generation component.

FIG. 14 is a schematic illustration showing generation of license 1016 in DRM system 1000 of the preferred embodiment, the process and operation of the DRM system being discussed in detail below. Only the components required to generate license 1016 has been shown for clarity purposes, but other ancillary components of DRM system 1000 of FIG. 12 are referenced. Therefore, both FIG. 14 and FIG. 12 should be referenced to better understand license generation in DRM system 1000 in accordance with the illustrated embodiment.

End user 1014 receives protected content 1008 through an e-mail, or other distribution mechanism without license 1016 that is required to use or consume protected content 1008. End user 1014 attempts to open protected content 1008. Client 1006 detects that there is no license and extracts an identifier for protected content 1008 that identifies protected content 1008, for instance, content ID number. Such an identifier is preferably provided as metadata in protected content 1008, for instance, by using content preparation application 2014 when clear content is made into protected content 1008. Client 1006 automatically connects to content server 1004 via network 1028 and uploads identity of end user 1014 such as the user's e-mail address into content server 1004, as well as extracted content ID number associated with protected content 1008.

The following metadata may be added to protected content 1008 during its creation by content preparation application 2014:

Content identifier: a unique ID for the content.
Publisher or creator identifier a unique ID for the publisher or creator of the content.
Secondary content identifier A number assigned by the publisher or storefront. This typically is a catalog ID that is used by distribution point. This number is associated with content identifier.
Content server URL: A URL where licenses are obtained through license server.
Services URL: A URL that a "services" button (described below) connects to when services button is pressed.

The above is merely an example of the metadata components that may be provided. However, not all of the metadata need be captured for all protected content and the system can be designed to capture other metadata in other embodiments. For example, secondary identifiers or identity of the publisher or creator may not be required. In addition, services button feature need not be provided in certain embodiments. Moreover, whereas in the above examples, an online implementation was used so that URLs are provided in the metadata, in off line implementations or closed systems, URLs would not be applicable and other types of pointers may be used.

Content server 1004, through access list manager 1020, checks access list 1023 associated with identified protected content 1008 to determine whether end user 1014 is in trusted community 1015 associated with protected content 1008 and whether end user 1014 is to access protected content 1008 in decision block 1040. If content server 1004 identifies end user 1014 as being in trusted community 1015, i.e. on access list 1023, content server 1004 requests license server 1010 to issue license 1016 to end user 1014. If end user 1014 is not a member of the trusted community, then depending on policies followed by content server 1004 and ORM system 1000, a request for permission can be made, for instance, via a "services" button described further below.

It should also be noted that protected content 1008 that end user 1014 is given access to, does not have to be digital content itself, e.g. a multimedia file. Instead, protected content 1008 may be a means to obtain the actual digital content, for instance, a hyper link to such digital content that is available by download. It is also possible to reverse the above described process so that end user 1014 first obtains license 1016 and then, obtains protected content 1008. The downloading or otherwise obtaining of protected content 1008 may occur at any appropriate time.

Content server 1004 may be implemented with the ability to specify a "License Request Process", a policy which determines how DRM system 1000 handles a request to generate a license made by users that are not currently part of the access list, i.e. not in trusted community. When the requesting end user does not belong to access list 1023 for protected content 1008, license 1016 is not automatically generated Instead DRM system 1000 generates a exception and the request is handled according to the License Request Process which can be set to: "No Request" or "Make Request".

A "No Request" policy means that the end user, if not part of the trusted community, will automatically be denied access to the content. An error message may be shown to the requesting end user indicating that "the user is not authorized to use content".

A "Make Request" policy means that when an end user attempts to use content 1008 and the end user is not part of the trusted community, a request to the author of the content or administrator of content server 1004 is made and an information box is presented to the requesting user indicating that user can make a request to use protected content. Content server 1004 communicates the request to access list manager 1020, for example, by sending an e-mail to an administrator who is in charge of managing access list manager 1020 or accounts associated with each registered protected content. The request is entered in the "license request disposition" facility of content server 1004 where access list manager 1020 is used to either grant or deny the request for license 1016.

More specifically, when access list manager 1020 receives the notification, it proceeds to process the requests. In an implementation where access list manager 1020 is designed for intervention by an administrator, notification may be via e-mail with instructions and URL, so that the administrator can log into records of content server 1004. The administrator can then proceed to the "license request disposition" facility to process any one or all of the outstanding requests. For each request, the access list manager 1020 would either "grant" or "deny" the request.

Figure 15:
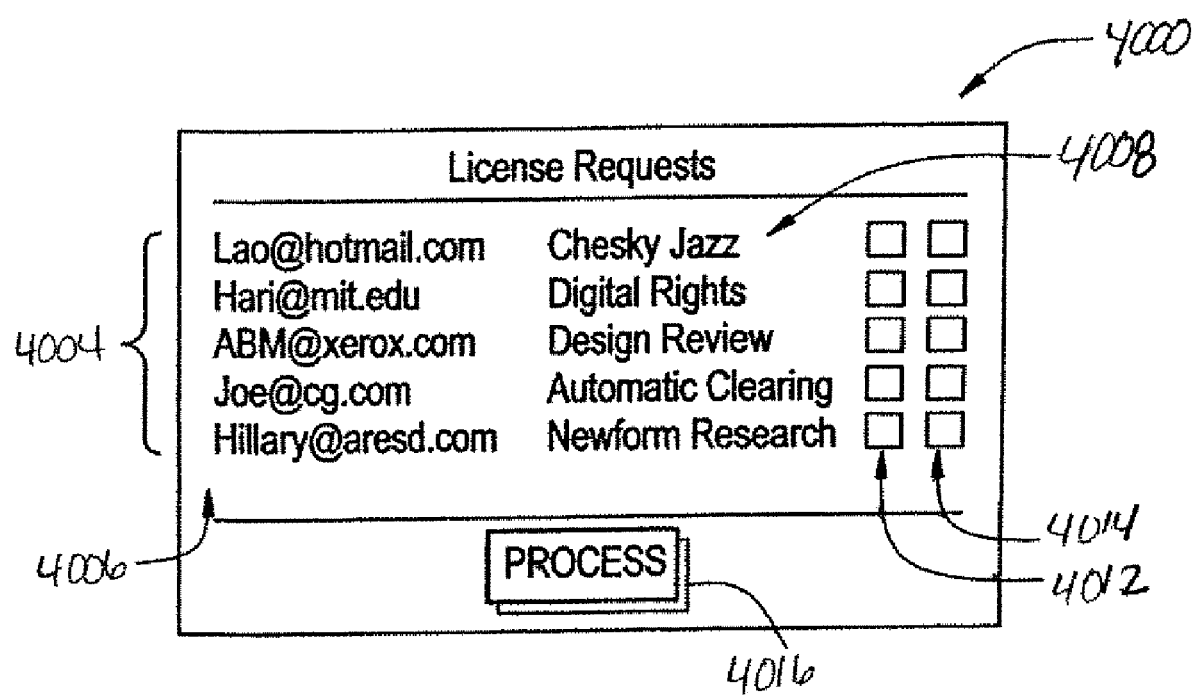
FIG. 15 illustrates a user interface of the embodiment.

One embodiment of user interface 4000 that may be used to present and process the request is shown in FIG. 15 for an implementation where access list manager 1020 is designed for intervention by an administrator. User interface 4000 lists each request 4004 that describes identifies the requester via email addresses 4006 and the requested content 4008. First column of check boxes 4012 may be selected by the administrator to grant the request while second column of check boxes 4014 is selected by the administrator to deny the request. Alternatively, the administrator could make a "counter offer" to the requester such as by offering to provide access under certain conditions, for instance, payment of a fee. After all the outstanding requests 4004 have been reviewed, the administrator can process them by clicking on a "process" button 4016.

Of course, in other embodiments, the above noted process may largely be automated where access list manager 1020 determines whether to grant or deny the request based on various predetermined parameters, for example, current demand for the requested protected content. Moreover, the request may be conditionally granted, for example, based on action of the requesting end user such as payment of a fee.

If the request is denied, the content server 1004 can communicate with the requesting end user, for example, by sending an e-mail with a message indicating that the request has been denied and that the end user is not authorized to use protected content 1008 requested. If the request is granted, access list manager 1020 of content server 1004 adds the requesting end user to access list 1023 associated with protected content 1008. The license server 1010 would then issue license 1016. In addition, the end user may be instructed to open and render the protected content. Alternatively, the communication could be dispensed with and the content automatically opened/rendered. In the preferred embodiment, the end user is not automatically added to address book 5030 discussed below relative to FIG. 8 because the assumption is that the end user is granted access only for that particular request. Of course, DRM system 1000 could be implemented to change that assumption. In any event, access list manager 1020 can add/delete the requester to/from, address book 5030, manually or automatically, based on pre-defined rules.

In other embodiments, features may be provided to allow specifying of parameters upon which a "request" or "no request" decision is made. For example, DRM system 1000 could be implemented to make requests during business hours or periods of low demand and to make no request at other times.

As previously discussed, access list manager 1020 manages access list 1023 stored in database 1022 that is associated with protected content 1008. In this regard, it was further noted that plurality of protected content is managed by access list manager 1020. FIG. 16 illustrates an example graphical user interface 5000 demonstrating a sample data structure that may be used to manage the plurality of protected content. An administrator overseeing operation of access list manager 1020 may access the illustrated graphical user interface 5000 by logging into content server 1004, and selecting the "Manage Access List" function button.

This button launches the illustrated windows with headings "PTC List" 5010, "Access List" 5020, and "Address Book" 5030. PTC List window 5010 lists protected contents 5012 managed by access list manager 1020 of content server 1004, and more specifically, PTC List window 5010 is a listing of all protected content in DRM system 1000 for which there are rights labels. In this regard, PTC List window 5010 is somewhat like a catalog and entries to this list are automatically added whenever a new protected content is registered into content server 1004. It should be noted however, that PTC List window 5010 is not a catalog that can be accessed by end users or any particular end user, The purpose of this list is to provide a mechanism for the content creator or administrator to manage access lists associated to each protected content and to aid in performance of other administrative tasks.

Once a protected content in PTC List window 5010 is selected, for instance, content entitled "Design Review", various information regarding the selected protected content is shown in section 5014 of PTC List 5010 such as metadata and rights associated with the particular protected content. An alternative implementation is to have the administrator click on a button such as a "show details" button before the details are shown.

In addition, Access List window 5020 that is associated with the protected content "Design Review" is shown. As discussed previously, whenever a protected content is created, an access list associated thereto is created. If the creator of the protected content or administrator does not put any entries in the access list, the access list would be "empty". Empty access lists which may be specially indicated in PCT List window 5010. In the illustrated example, only one end user identified by e-mail address "Lao@hotmail.com" is listed in Access List window 5020.

In addition, Address Book window 5030 is also displayed which may be used to add/delete end users to the access list for the displayed protected content, namely for "Design Review" in the illustrated example. As shown, Address Book window 5030 lists various end users 5032 that may be added to Access List window 5020 by selecting the desired end user in Address Book window 5030, and clicking add arrow 5036. Likewise, an end user already listed in Access List window 5020 may be removed by selecting the desired end user in Access List window 5020 and clicking remove arrow 5038.

The address books supports the customary elements for an address book such as individuals and distribution lists. In this regard, entries in Address Book window 5030 may be existing distribution lists within an organization, derived from such distribution lists, or individual entries for individuals. In addition, the address book supports "wild-card" entries such as "everyone@contentguard.com" or "@contentguard.com" it, for example, an access list is to allow access to a protected content to everyone within a domain. Entries in Address Book window 5030 can be manually created or imported to the DRM system through customary means such as LDAP directory services, CSV files, etc. In the above described manner, the administrator may add/delete end users from the trusted community by adding/deleting end users from the access list.

In addition to the above described features, DRM systems in accordance with the present invention may also be provided with other ancillary features as well. One optional feature which may be implemented via DRM system 1000 of FIG. 12 is a "services button" that establishes a connection between various parties privy to DRM system 1000 to facilitate communication or other function. Services button may be used for any function or service specified by DRM system's design. For example, services button may connect client application 2010 to a web server and pass information to server application 2020 based on end user's activity. Specifically, when services button is clicked, client 1006 tries to connect to a URL that is specified in the currently active, opened protected content. This URL could lead to any service such as an on-line store offering related content for sale, or a connection to a users group discussing a similar or related topic.

When the services button is clicked, but no services URL is found in the content currently active, a message acknowledging the use of the services button may be presented which states that for the particular content, creator of the protected content has not offered any additional services. The DRM system 1000 may be designed so that the services button appears only when a protected content is active so that if there are no protected contents opened, the services button disappears.

The above example was an on-line system using URLs. This would be a typical embodiment involving commerce over network 1028 such as the Internet The principles work with an off-line or closed system as well. In such closed systems, one can access additional services within a single enterprise and without connecting to the Internet, or without going on-line at all.

In another embodiment, a "Connect to Community" feature may be provided by content server 1004 that allows the administrator or other individuals to electronically contact members of trusted community 1015 thereby facilitating communication. The administrator or content creator may want to send an electronic note to all the listed end users 1014 of a particular protected content 1008 that form trusted community 1015, for example, to indicate that a new version of protected content 1008 is available, or just to start some discussion regarding protected content 1008. This feature may be implemented by GUI that allows selection of one or more members of access list 1023, or selecting the entire access list 1023 by sending the message to the associated protected content 1008, and merely clicking a button marked "send message". A mail form may be launched so that the administrator can create a note addressed to the appropriate party. By actuating "send", the administrator sends the created note to the indicated parties.

Another example of use for the services button is in providing a "Connect to Author" function in which an end user using a protected content wishes to send an e-mail to the author/creator of protected content 1008 via content server 1004. End user 1014 clicks on the services button which connects end user 1014 to content server 1004 and presents an e-mail form or web page which end user 1014 can use to send a message to the author of the protected content 1008. A typical design would launch the mail form/web page in a separate window so end user 1014 may still access protected content 108 while writing the message End user's identity and protected content ID may be sent to content server 1004 so that content server 1004 can automatically populate the "from" field and the "subject" field of the mail form. User enters a message and clicks "send". The e-mail of the author may, or may not, be shown for privacy reasons, etc. Of course, related features such as "send a copy to yourself" may be provided as well. After the message is sent, the content server 1004 would close the mail form. In order to provide the described "Connect to Author" function, input of the e-mail address of the creator of the protected content 1008 would be required during its registration into content server 1004.

DRM system 100 in accordance with another embodiment may also be adapted to provide further protection for access to protected content 1008 where client 1006 includes a protection application, or alternatively, where the protected application is hosted by content server 1004 and accessed over network 1028 such as the Internet. In one embodiment, the protection application, whether as a local application, or as a web-based application hosted in content server 1004, supports a graphic user interface/workflow that requires login with password authentication.

In addition, in another embodiment, distribution of protected content may be preferably designated by the author/creator of the protected content or an administrator who otherwise controls the protected content to further ensure security for accessing protected content 1008. Protected content 1008 may be designated to be protected and downloaded as a protected file so that the creator or administrator may distribute the protected content through e-mail, or place the protected content in some existing repository, for instance, clearinghouse 90 discussed above relative to FIG. 1. Alternatively, the creator or administrator may also designate that protected content 1008 be "published" to a document portal served by content server 1004, in which case, additional metadata would be desirable, for example, an abstract of the content.

In another embodiment, content server 1004 may be provided with reporting functions for reporting general statistics such as number of licenses generated by license server 1010, number of protected contents that are registered, etc. Content server 1004 may also have features for reporting specific statistics such as number of licenses issued per specific protected content, all licenses issued with the associated content identifier and/or the end user identifier, licenses for each protected content, etc. Other general statistics may also be reported including number of request received, number of requests granted, number of requests denied, and time to process a request such as average, mean, maximum and minimum time required.

Therefore, in view of the above, content server 1004 and other components of DRM system 1000 as shown in FIG. 12 enable the end-to-end workflow where many functions are attained to provide a portal for consuming protected content 1008. In the above discussed manner, DRM system 1000 acts to manage rights labels; generate, process and dispose of licenses; manage protected content; provide address book functionality; manage access lists; provide reporting features; provide services button to allow communication; facilitate communication; and account management. Of course, in still other embodiments, other ancillary features may be provided as well.

Furthermore, it should again be understood that whereas the terms "server" and "client" are is used to describe the devices for implementing the present invention in the illustrated embodiments above, these terms should be broadly understood to mean any appropriate device for executing the described function, such as a personal computer, hand held computer, PDA, or any other general purpose programmable computer or combination of such devices, such as a network of computers. Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various devices and components are segregated by function for the purpose of clarity. However, the various elements can be combined into one device or segregated in a different manner. For example, the software package and/or licenses can be a single executable file and data files, or plural files or modules stored on the same device or on different devices. The software package can include any mechanism for enforcing security and need not include a rendering application or the like.

Any protocols, data types, or data structures can be used in accordance with the invention. Moreover, any appropriate means of expressing usage rights and conditions may be used in implementing the present invention. For instance, as previously noted, a rights language grammar such as XrML™ or any other appropriate grammar can be used. In addition, software using objects or an object-oriented software development environment may be used that provides portable source code that can be used on a variety of computer hardware platforms. For example, the software used in implementation of the present invention can be written in the JAVA language and run in a JAVA virtual machine. Alternatively, the disclosed operations may be implemented partially or fully in a hardware using standard logic circuits or VLSI designs. The hardware can include any type of general purpose computer, dedicated computer, or other devices.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

The preferred embodiment as described above can be used in a subscription model (for example, for magazine or marketing reports) in which the future issues of the content have not been published, but the rights for those issues have already been assigned and stored. At an appropriate future time, the rights will be associated with the corresponding content. By selling the content of a future event through a vendor such as a web site before the actual event, the traffic of the web site or other distribution device can be drastically reduced and distributed over a longer period of time, making the requirements for the servers and the web site easier to satisfy and less expensive to operate. Note, however, that the entity selling the rights or tickets, i.e. the license, might be different from the entity providing the content later on.

It should again be understood that whereas the terms "server" and "system" are used to describe the devices for implementing the present invention in the illustrated embodiments above, these terms should be broadly understood to mean any appropriate device for executing the described function, such as a personal computer, hand held computer, PDA, or any other general purpose programmable computer or combination of such devices, such as a network of computers. Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various devices and components are segregated by function for the purpose of clarity. However, the various elements can be combined into one device or segregated in a different manner. For example, the software package and/or licenses can be a single executable file and data files, or plural files or modules stored on the same device or on different devices. The software package can include any mechanism for enforcing security and need not include a rendering application or the like.

Any protocols, data types, or data structures can be used in accordance with the invention. Moreover, any appropriate means of expressing usage rights and conditions may be used in implementing the present invention. For instance, as previously noted, a rights language grammar such as XrML™ can be used. In addition, software using objects or an object-oriented software development environment may be used that provides portable source code that can be used on a variety of computer hardware platforms. For example, the software used in implementation of the present invention can be written in the JAVA™ language and run in a JAVA™ virtual machine. Alternatively, the disclosed operations may be implemented partially or fully in a hardware using standard logic circuits or VLSI designs. The hardware can include any type of general purpose computer, dedicated computer, or other devices.

While various embodiments in accordance with the present invention have been shown and described, it is understood that the invention is not limited thereto. The present invention may be changed, modified and further applied by those skilled in the art Therefore, this invention is not limited to the detail shown and described previously, but also includes all such changes and modifications within the scope of the appended claims and legal equivalents.

We claim:

1. A system for managing use of an item of digital content based on usage rights associated with the item of digital content, the usage rights being enforceable by a user device, said system comprising:
    an access list defining a trusted community of content users subscribed to a content service;
    a content device configured to associate digital contents with the content service;
    a policy device specifying a license request process to handle a license request made by a user that is not subscribed to the content service, the license request process permitting issuance of a license to a user that is not subscribed to the content service upon payment of a fee; and
    a license device configured to issue a license to a user, wherein the license device is configured to:
        receive a license request from a user device,
        determine based on the access list if the user is currently subscribed to the content service, and
        issue a subscription license to the user if the user is currently subscribed to the content service, the subscription license granting the user the right to use digital contents associated with the content service, including future contents, and if the user is not currently subscribed to the content service, and the request is for use of a digital content associated with the content service, executing the license request process to issue a usage license to the user for use of the requested digital content upon receiving a fee.

2. A system as recited in claim 1, wherein the subscription license includes a condition for use of digital contents associated with the content service.

3. A system as recited in claim 1, wherein the usage license is associated with the specific item of digital content requested by the user.

4. A system as recited in claim 1, wherein the subscription license is associated with all digital content associated with the content service.

5. A system as recited in claim 1, further comprising a management device configured to at least one of add and delete users from the access list to thereby change users within the trusted community.

6. A system as recited in claim 1, wherein the usage license permits the user to use the requested digital content in a specified manner.

7. A method for managing use of an item of digital content based on usage rights associated with the item of digital content, the usage rights being enforceable by a user device, said method comprising:
    creating, using a computing device, an access list defining a trusted community of content users subscribed to a content service;
    associating, using a content device, digital contents with the content service;
    specifying, using a policy device, a license request process to handle a license request made by a user that is not subscribed to the content service, the license request process permitting issuance of a license to a user that is not subscribed to the content service upon payment of a fee;
    receiving, at the license device, a license request from a user device;

determining, using the license device, based on the access list if the user is currently subscribed to the content service; and issuing, using the license device, a subscription license to the user if the user is currently subscribed to the content service, the subscription license granting the user the right to use digital contents associated with the content service, including future contents, and, if the user is not currently subscribed to the content service, and the request is for use of a digital content associated with the content service, executing the license request process to issue a usage license to the user for use of the requested digital content upon receiving a fee.

8. A method as recited in claim 7, wherein the subscription license includes a condition for use of digital contents associated with the content service.

9. A method as recited in claim 7, wherein the usage license is associated with the specific item of digital content requested by the user.

10. A method as recited in claim 7, wherein the subscription license is associated with all digital content associated with the content service.

11. A method as recited in claim 7, further comprising at least one of adding and deleting users from the access list to thereby change users within the trusted community.

12. A method as recited in claim 7, wherein the usage license permits the user to use the requested digital content in a specified manner.

13. Computer readable media for use in a system for managing use of an item of digital content based on usage rights associated with the item of digital content, the usage rights being enforceable by a user device, said media comprising:

instructions for creating, using a computing device, an access list defining a trusted community of content users subscribed to a content service;

instructions for associating, using a content device, digital contents with the content service;

instructions for specifying, using a policy device, a license request process to handle a license request made by a user that is not subscribed to the content service, the license request process permitting issuance of a license to a user that is not subscribed to the content service upon payment of a fee;

instructions for receiving, at the license device, a license request from a user device;

instructions for determining, using the license device, based on the access list if the user is currently subscribed to the content service; and instructions for issuing, using the license device, a subscription license to the user if the user is currently subscribed to the content service, the subscription license granting the user the right to use digital contents associated with the content service, including future contents, and, if the user is not currently subscribed to the content service, and the request is for use of a digital content associated with the content service, executing the license request process to issue a usage license to the user for use of the requested digital content upon receiving a fee.

14. Media as recited in claim 13, wherein the subscription license includes a condition for use of digital contents associated with the content service.

15. Media as recited in claim 13, wherein the usage license is associated with the specific item of digital content requested by the user.

16. Media as recited in claim 13, wherein the subscription license is associated with all digital content associated with the content service.

17. Media as recited in claim 13, further comprising at least one of instructions for adding and deleting users from the access list to thereby change users within the trusted community.

18. Media as recited in claim 13, wherein the usage license permits the user to use the requested digital content in a specified manner.

* * * * *

UNITED STATES PATENT AND TRADEMARK OFFICE
CERTIFICATE OF CORRECTION

| | |
|---|---|
| PATENT NO. | : 8,275,709 B2 |
| APPLICATION NO. | : 12/144732 |
| DATED | : September 25, 2012 |
| INVENTOR(S) | : Xing Wang et al. |

It is certified that error appears in the above-identified patent and that said Letters Patent is hereby corrected as shown below:

On the Title Page, the "Related U.S. Application Data" is replaced with the following:

--Continuation-in-part of application No. 10/162,699, filed on Jun. 6, 2002, now Pat No. 8,099,364, which is a continuation-in-part of application No. 09/867,747, filed on May 31, 2001, now Pat. No. 6,876,984.

Provisional application No. 60/296,114, filed on Jun. 7, 2001, provisional application No. 60/296,116, filed on Jun. 7, 2001, provisional application No. 60/297,239, filed on Jun. 12, 2001.--

In Col. 1, lines 7-13 of the specification, which describes the "RELATED APPLICATION DATA," should be replaced with the following:

--This application is a Continuation-In-Part application to U.S. utility application Ser. No. 10/162,699, filed Jun. 6, 2002, now U.S. Patent No. 8,099,364 entitled Digital Rights Management Of Content When Content Is A Future Live Event, which is a Continuation-In-Part of U.S. Patent Application No. 09/867,747, filed May 31, 2001, now U.S. Patent No. 6,876,984, and also claims priority to U.S. Provisional Application Nos. 60/296,114, filed Jun. 7, 2001, 2001, 60/296,116, filed on Jun. 7, 2001, and 60/297,239, filed on Jun. 12, the entire disclosures of which are incorporated herein by reference.--

Signed and Sealed this
Twelfth Day of February, 2013

Teresa Stanek Rea
*Acting Director of the United States Patent and Trademark Office*